US007048781B1

(12) United States Patent
Lovell

(10) Patent No.: US 7,048,781 B1
(45) Date of Patent: May 23, 2006

(54) CHEMICALLY-IMPREGNATED SILICATE AGENTS FOR MERCURY CONTROL

(75) Inventor: John Stanley Lovell, Arvada, CO (US)

(73) Assignee: ADA Technologies, Inc., Littleton, CO (US)

( * ) Notice: Subject to any disclaimer, the term of this patent is extended or adjusted under 35 U.S.C. 154(b) by 175 days.

(21) Appl. No.: 10/681,671

(22) Filed: Oct. 7, 2003

Related U.S. Application Data

(60) Provisional application No. 60/416,994, filed on Oct. 7, 2002.

(51) Int. Cl.
*B01D 53/04* (2006.01)
*B01D 53/64* (2006.01)

(52) U.S. Cl. .......................... 95/134; 95/900; 96/108; 210/688; 423/210

(58) Field of Classification Search ................ 95/133, 95/134, 900, 902; 96/108, 134–136; 210/688, 210/912, 913, 903; 423/210; 55/524, DIG. 5
See application file for complete search history.

(56) References Cited

U.S. PATENT DOCUMENTS

| 1,697,095 | A | 1/1929 | Tumer |
| 2,145,901 | A | 2/1939 | Shoemaker ................... 210/23 |
| 2,367,496 | A | 1/1945 | Greentree ................... 252/299 |
| 2,860,952 | A | 11/1958 | Bergeron et al. ............. 23/134 |
| 3,194,629 | A | 7/1965 | Dreibelbis et al. ................ 23/2 |
| 3,201,149 | A | 8/1965 | Bragg ......................... 285/39 |
| 3,232,033 | A | 2/1966 | Williston et al. ............. 55/387 |
| 3,257,776 | A | 6/1966 | Park et al. ...................... 55/72 |
| 3,374,608 | A | 3/1968 | Manes ........................... 55/72 |
| 3,499,837 | A | 3/1970 | Jaunarajs ..................... 210/59 |
| 3,516,947 | A | 6/1970 | Dudzik ....................... 252/439 |
| 3,576,947 | A | 5/1971 | Kruger ...................... 178/69.5 |
| 3,674,428 | A | 7/1972 | Dean et al. .................. 23/134 |
| 3,677,696 | A | 7/1972 | Bryk et al. ...................... 23/2 |
| 3,740,331 | A | 6/1973 | Anderson et al. ............ 210/53 |
| 3,749,761 | A | 7/1973 | Dean et al. ................. 423/562 |
| 3,755,161 | A | 8/1973 | Yokota et al. ................ 210/36 |
| 3,755,189 | A * | 9/1973 | Fornoff et al. ................ 95/134 |
| 3,790,370 | A | 2/1974 | Lalancette ................... 75/108 |
| 3,835,217 | A | 9/1974 | Dunsmoor .................. 423/499 |
| 3,847,598 | A | 11/1974 | Coulter et al. ............... 75/121 |
| 3,857,704 | A | 12/1974 | Coulter ........................ 75/121 |
| 3,864,327 | A | 2/1975 | Marchant ................ 260/231 A |
| 3,873,581 | A | 3/1975 | Fitzpatrick et al. ......... 260/370 |
| 3,876,451 | A | 4/1975 | Zall ............................ 117/62 |
| 3,890,225 | A | 6/1975 | Kajiyama .................... 210/38 |
| 3,935,098 | A | 1/1976 | Oda et al. .................... 210/38 |
| 3,947,354 | A | 3/1976 | Swanson et al. ............. 210/53 |
| 3,948,863 | A | 4/1976 | Akamatsu et al. ........ 260/78 A |
| 3,961,031 | A | 6/1976 | Yasui et al. ................ 423/210 |
| 3,969,244 | A | 7/1976 | Kobayashi et al. ....... 210/38 B |
| 3,984,606 | A | 10/1976 | Morgan ...................... 428/419 |
| 3,994,719 | A | 11/1976 | Corte et al. ............. 75/101 BE |
| 3,999,825 | A | 12/1976 | Cannon ....................... 339/15 |
| 4,008,937 | A | 2/1977 | Filippi ........................ 339/15 |
| 4,038,071 | A | 7/1977 | Di Bella ...................... 75/108 |
| 4,051,316 | A | 9/1977 | Wing et al. ................. 536/107 |
| 4,053,401 | A | 10/1977 | Fukushima et al. .......... 210/52 |
| 4,069,140 | A | 1/1978 | Wunderlich ............ 208/251 H |
| 4,072,605 | A | 2/1978 | Thelander .................... 210/50 |
| 4,083,783 | A | 4/1978 | Wing et al. .................. 210/54 |
| 4,087,359 | A | 5/1978 | Patron et al. ................ 210/50 |
| 4,094,777 | A | 6/1978 | Sugier et al. ................ 210/32 |
| 4,101,631 | A | 7/1978 | Ambrosini et al. ......... 423/210 |
| 4,102,982 | A | 7/1978 | Weir, Jr. ................. 423/243.1 |
| 4,108,769 | A | 8/1978 | Krieg et al. ................. 210/50 |
| 4,118,243 | A | 10/1978 | Sandesara .................. 106/109 |
| 4,133,755 | A | 1/1979 | Tarao et al. ............. 210/38 B |
| 4,147,626 | A | 4/1979 | Findlay et al. ............... 210/52 |
| 4,151,077 | A | 4/1979 | Nogueira et al. ............ 210/21 |
| 4,153,556 | A | 5/1979 | Riedinger .................. 210/218 |
| 4,160,730 | A | 7/1979 | Nguyen ....................... 210/48 |
| 4,196,173 | A | 4/1980 | deJong et al. .............. 423/210 |
| 4,230,486 | A | 10/1980 | Capuano et al. .............. 75/81 |
| 4,233,274 | A | 11/1980 | Allgulin .................... 423/210 |
| 4,238,329 | A | 12/1980 | Zievers ........................ 210/36 |
| 4,245,989 | A | 1/1981 | Folkenroth et al. .......... 433/92 |
| 4,249,786 | A | 2/1981 | Mahoff ........................ 339/15 |
| 4,256,227 | A | 3/1981 | Petrovich .................... 209/166 |
| 4,256,707 | A | 3/1981 | Flynn, Jr. et al. ............ 423/42 |
| 4,260,494 | A | 4/1981 | Dotson et al. .............. 210/721 |
| 4,273,747 | A | 6/1981 | Rasmussen ................ 423/210 |
| 4,278,820 | A | 7/1981 | Kametaka et al. |
| 4,285,564 | A | 8/1981 | Spinner ..................... 339/89 C |
| 4,340,623 | A | 7/1982 | Justus ........................ 427/361 |
| 4,354,942 | A | 10/1982 | Kaczur et al. .............. 210/712 |
| 4,363,749 | A | 12/1982 | Weiss et al. .............. 252/455 R |
| 4,369,167 | A | 1/1983 | Weir, Jr. .................... 423/210 |
| 4,377,483 | A | 3/1983 | Yamashita et al. .......... 210/670 |

(Continued)

FOREIGN PATENT DOCUMENTS

CA 2173171 10/1996

(Continued)

OTHER PUBLICATIONS

Jan. 20, 2003 print-out of E-watertechnologies' website at http://www.e-watertechnologies.com. regarding Whole House Anion Water Conditioner, 2 pages.

(Continued)

*Primary Examiner*—Robert H. Spitzer
(74) *Attorney, Agent, or Firm*—Sheridan Ross P.C.

(57) ABSTRACT

The present invention is directed to a contaminant removal agent comprising a polyvalent metal sulfide on the surface of an inert substrate. The substrate can be a layered silicate, such as vermiculite, an aluminosilicate such as montmorillonite, or a nonlayered silicate such as a zeolite. The agent removes mercury from process streams. The ion exchange to deposit the polyvalent metal on the substrate is preferably performed at a pH above the $pH_{ZPC}$.

69 Claims, 9 Drawing Sheets

U.S. PATENT DOCUMENTS

| | | | | |
|---|---|---|---|---|
| 4,385,891 A | 5/1983 | Ligotti | | 433/92 |
| 4,410,751 A | 10/1983 | Shin et al. | | |
| 4,419,107 A | 12/1983 | Roydhouse | | 55/5 |
| 4,443,417 A | 4/1984 | Wiklund | | 423/210 |
| 4,459,370 A | 7/1984 | van der Wal et al. | | 502/338 |
| 4,474,896 A | 10/1984 | Chao | | 502/216 |
| 4,500,327 A | 2/1985 | Nishino et al. | | 55/72 |
| 4,564,374 A | 1/1986 | Hofmann | | 55/57 |
| 4,583,999 A | 4/1986 | Lindahl et al. | | 55/68 |
| 4,591,437 A | 5/1986 | Emryd et al. | | 210/265 |
| 4,591,490 A | * 5/1986 | Horton | | 423/210 |
| 4,599,177 A | 7/1986 | Hayashi et al. | | 210/718 |
| 4,614,592 A | 9/1986 | Googin et al. | | 210/679 |
| 4,654,322 A | 3/1987 | Holbein et al. | | 502/403 |
| 4,670,160 A | 6/1987 | Moriya et al. | | 210/728 |
| 4,693,731 A | 9/1987 | Tarakad et al. | | 55/72 |
| 4,695,447 A | 9/1987 | Shultz | | 423/659 |
| 4,709,118 A | 11/1987 | Yan | | 585/820 |
| 4,721,582 A | 1/1988 | Nelson | | 252/189 |
| 4,722,918 A | 2/1988 | Schneider et al. | | |
| 4,731,187 A | 3/1988 | Moriya et al. | | 210/719 |
| 4,740,488 A | 4/1988 | Fogler et al. | | |
| 4,752,398 A | 6/1988 | Holbein et al. | | 210/679 |
| 4,753,632 A | 6/1988 | Hofmann et al. | | 494/43 |
| 4,753,909 A | 6/1988 | Bousquet et al. | | |
| 4,764,219 A | 8/1988 | Yan | | 134/2 |
| 4,764,355 A | 8/1988 | Romey et al. | | 423/244 |
| 4,771,030 A | 9/1988 | Audeh | | 502/414 |
| 4,774,213 A | 9/1988 | Schneider et al. | | |
| 4,786,483 A | 11/1988 | Audeh | | 423/210 |
| 4,786,484 A | 11/1988 | Nelson | | 423/239 |
| 4,814,091 A | 3/1989 | Napier et al. | | 210/665 |
| 4,814,152 A | 3/1989 | Yan | | 423/210 |
| 4,834,953 A | 5/1989 | Audeh | | 423/210 |
| 4,843,102 A | 6/1989 | Horton | | 521/28 |
| 4,844,815 A | 7/1989 | Ader et al. | | 210/751 |
| 4,861,493 A | 8/1989 | Jansen | | 210/715 |
| 4,877,515 A | 10/1989 | Audeh | | 208/251 R |
| 4,892,567 A | 1/1990 | Yan | | 55/33 |
| 4,902,662 A | 2/1990 | Toulboat et al. | | 502/216 |
| 4,909,926 A | 3/1990 | Yan | | 208/253 |
| 4,909,944 A | 3/1990 | Jackson et al. | | 210/674 |
| 4,911,825 A | 3/1990 | Roussel et al. | | 208/251 R |
| 4,915,818 A | 4/1990 | Yan | | 208/251 |
| 4,917,862 A | 4/1990 | Kraw et al. | | 423/4 |
| 4,919,826 A | 4/1990 | Alzner | | 210/788 |
| 4,933,158 A | 6/1990 | Aritsuka et al. | | 423/210 |
| 4,950,408 A | 8/1990 | Duisters et al. | | 210/660 |
| 4,962,276 A | 10/1990 | Yan | | 585/867 |
| 4,969,995 A | 11/1990 | Jackson et al. | | 210/263 |
| 4,985,389 A | 1/1991 | Audeh | | 502/516 |
| 4,986,898 A | 1/1991 | Torihata et al. | | 208/251 |
| 5,013,337 A | * 5/1991 | Bedard et al. | | 95/123 |
| 5,017,135 A | 5/1991 | Meyer | | 433/92 |
| 5,024,683 A | * 6/1991 | Tooley et al. | | 95/141 |
| 5,034,054 A | 7/1991 | Woodward | | 75/388 |
| 5,034,203 A | * 7/1991 | Audeh et al. | | 423/210 |
| 5,053,209 A | 10/1991 | Yan | | 423/210 |
| 5,062,948 A | 11/1991 | Kawazoe et al. | | 208/251 |
| 5,064,626 A | 11/1991 | Johnson et al. | | 423/245.1 |
| 5,080,799 A | 1/1992 | Yan | | 210/661 |
| 5,085,844 A | 2/1992 | Nowack et al. | | 423/245.1 |
| 5,107,060 A | 4/1992 | Yan | | 585/823 |
| 5,110,480 A | * 5/1992 | Yan | | 210/670 |
| 5,114,578 A | 5/1992 | Sundström | | 210/256 |
| 5,120,515 A | 6/1992 | Audeh et al. | | 423/210 |
| 5,141,724 A | 8/1992 | Audeh et al. | | 423/210 |
| 5,154,833 A | 10/1992 | Robinson | | 210/664 |
| 5,173,286 A | 12/1992 | Audeh | | 423/566.1 |
| 5,192,163 A | 3/1993 | Fleming | | 405/128 |
| 5,202,301 A | 4/1993 | McNamara | | 502/417 |
| 5,209,773 A | 5/1993 | Audhe et al. | | 75/388 |
| 5,225,175 A | 7/1993 | Lyon | | 423/235 |
| 5,227,053 A | 7/1993 | Brym | | 210/143 |
| 5,238,488 A | 8/1993 | Wilhelm | | 75/742 |
| 5,245,106 A | 9/1993 | Cameron et al. | | 585/823 |
| 5,248,488 A | 9/1993 | Yan | | 423/210 |
| 5,256,615 A | 10/1993 | Oomura et al. | | |
| 5,294,417 A | 3/1994 | Moore et al. | | 423/101 |
| 5,298,168 A | 3/1994 | Guess | | 210/713 |
| 5,304,693 A | 4/1994 | Boitiaux et al. | | 585/648 |
| 5,308,500 A | 5/1994 | Schwarzbach | | 210/716 |
| 5,322,628 A | 6/1994 | Yan | | 210/673 |
| 5,330,658 A | 7/1994 | Grant et al. | | 210/717 |
| 5,336,704 A | * 8/1994 | Rainer | | 524/30 |
| 5,336,835 A | 8/1994 | McNamara | | 585/820 |
| 5,338,444 A | 8/1994 | van Buren et al. | | 210/660 |
| 5,350,728 A | * 9/1994 | Cameron et al. | | 502/415 |
| 5,357,002 A | 10/1994 | Lezzi et al. | | 525/332.2 |
| 5,360,632 A | 11/1994 | Johnson et al. | | 427/212 |
| 5,369,072 A | 11/1994 | Benjamin et al. | | 502/84 |
| 5,370,827 A | 12/1994 | Grant et al. | | 588/18 |
| 5,391,217 A | 2/1995 | Zoche | | 75/724 |
| 5,409,522 A | 4/1995 | Durham et al. | | 75/670 |
| 5,419,884 A | 5/1995 | Weekman et al. | | 423/210 |
| 5,421,994 A | 6/1995 | Sarrazin et al. | | 208/251 R |
| 5,435,980 A | 7/1995 | Felsvang et al. | | |
| 5,437,797 A | 8/1995 | Helmig | | 210/669 |
| 5,460,643 A | 10/1995 | Hasenpusch et al. | | 95/134 |
| 5,463,167 A | 10/1995 | Ou | | 585/823 |
| 5,492,627 A | 2/1996 | Hagen et al. | | 210/651 |
| 5,523,067 A | 6/1996 | Markovs | | 423/99 |
| 5,536,416 A | 7/1996 | Coltrinari et al. | | 210/723 |
| 5,569,436 A | 10/1996 | Lerner | | 422/170 |
| 5,577,910 A | 11/1996 | Holland | | 433/92 |
| 5,599,508 A | 2/1997 | Martinelli et al. | | 422/169 |
| 5,599,515 A | 2/1997 | Misra et al. | | 423/101 |
| 5,607,496 A | 3/1997 | Brooks | | 75/670 |
| 5,610,113 A | 3/1997 | Matsui et al. | | |
| 5,613,851 A | 3/1997 | Trawöger et al. | | 433/92 |
| 5,658,487 A | 8/1997 | Carey et al. | | 252/180 |
| 5,667,695 A | 9/1997 | Bedard et al. | | 210/681 |
| 5,670,122 A | 9/1997 | Zamansky et al. | | 423/210 |
| 5,672,323 A | 9/1997 | Bhat et al. | | 422/172 |
| 5,679,259 A | 10/1997 | Bolser | | 210/719 |
| 5,695,726 A | 12/1997 | Lerner | | 423/210 |
| 5,736,053 A | * 4/1998 | Ikushima et al. | | 210/688 |
| 5,741,397 A | 4/1998 | Kraver | | 159/25.2 |
| 5,753,125 A | 5/1998 | Kreisler | | 210/710 |
| 5,795,159 A | 8/1998 | Ralls et al. | | 433/92 |
| 5,797,742 A | 8/1998 | Fraker | | 433/92 |
| 5,827,352 A | 10/1998 | Altman et al. | | 95/58 |
| 5,846,434 A | 12/1998 | Seaman et al. | | 210/724 |
| 5,880,060 A | 3/1999 | Blake et al. | | 502/411 |
| 5,885,076 A | 3/1999 | Ralls et al. | | 433/92 |
| 5,898,093 A | 4/1999 | Vos | | 588/236 |
| 5,900,042 A | 5/1999 | Mendelsohn et al. | | 75/742 |
| 5,907,037 A | 5/1999 | Gujral et al. | | 536/59 |
| 5,908,559 A | 6/1999 | Kreisler | | 210/710 |
| 5,919,001 A | 7/1999 | Lin | | 405/128 |
| 5,922,277 A | 7/1999 | Donhoff et al. | | 422/1 |
| 5,967,965 A | 10/1999 | Vyshkina et al. | | 588/256 |
| 5,976,270 A | 11/1999 | Zelez et al. | | 134/28 |
| 5,976,383 A | 11/1999 | Guess et al. | | 210/711 |
| 5,986,161 A | 11/1999 | Akae et al. | | 588/231 |
| 6,022,216 A | 2/2000 | Cattani | | 433/92 |
| 6,024,239 A | 2/2000 | Turner et al. | | 220/269 |
| 6,077,439 A | * 6/2000 | El-Ammouri et al. | | 210/665 |
| 6,083,306 A | 7/2000 | Cattani | | 96/157 |
| 6,083,473 A | 7/2000 | Esquivel et al. | | 423/576.8 |
| 6,103,205 A | 8/2000 | Wojtowicz et al. | | 423/210 |
| 6,132,623 A | 10/2000 | Nikolaidis et al. | | 210/719 |
| 6,136,281 A | 10/2000 | Meischen et al. | | 423/210 |
| 6,139,485 A | 10/2000 | Pal et al. | | 588/256 |

| | | | | |
|---|---|---|---|---|
| 6,139,751 | A | 10/2000 | Bogaert et al. | 210/679 |
| 6,153,108 | A | 11/2000 | Klock et al. | 210/722 |
| 6,165,366 | A | 12/2000 | Sarangapani | 210/666 |
| 6,166,278 | A | 12/2000 | Engelhardt et al. | |
| 6,214,304 | B1 | 4/2001 | Rosenthal et al. | 423/210 |
| 6,258,334 | B1* | 7/2001 | Gadkaree et al. | 423/210 |
| 6,270,679 | B1 | 8/2001 | Kreisler | 210/710 |
| 6,274,045 | B1 | 8/2001 | Kreisler | 210/710 |
| 6,284,208 | B1 | 9/2001 | Thomassen | 423/210 |
| 6,294,139 | B1 | 9/2001 | Vicard et al. | 423/210 |
| 6,322,613 | B1 | 11/2001 | Wojtowicz et al. | 95/107 |
| 6,372,187 | B1 | 4/2002 | Madden et al. | 422/171 |
| 6,375,909 | B1 | 4/2002 | Dangtran et al. | 423/235 |
| 6,387,276 | B1 | 5/2002 | Nikolaidis et al. | 210/719 |
| 6,403,044 | B1 | 6/2002 | Litz et al. | 423/101 |
| 6,432,858 | B1 | 8/2002 | Tezuka | |
| 6,447,740 | B1 | 9/2002 | Caldwell et al. | 423/210 |
| 6,475,451 | B1* | 11/2002 | Leppin et al. | 423/210 |
| 6,524,371 | B1 | 2/2003 | El-Shoubary et al. | 95/134 |
| 6,533,842 | B1 | 3/2003 | Maes et al. | 92/134 |
| 6,534,024 | B1 | 3/2003 | Honjo et al. | 423/210 |
| 6,558,642 | B1 | 5/2003 | El-Shoubary et al. | 423/245.3 |
| 6,638,347 | B1 | 10/2003 | El-Shoubary et al. | |
| 6,719,828 | B1* | 4/2004 | Lovell et al. | 95/134 |
| 6,734,131 | B1 | 5/2004 | Shih et al. | |
| 6,770,250 | B1* | 8/2004 | Cooper et al. | 423/210 |
| 6,797,178 | B1* | 9/2004 | Albiston et al. | 210/702 |
| 2001/0007647 | A1 | 7/2001 | Honjo et al. | 423/210 |
| 2001/0047956 | A1* | 12/2001 | Albiston et al. | 210/188 |
| 2002/0068030 | A1* | 6/2002 | Nolan et al. | 423/210 |
| 2002/0106317 | A1* | 8/2002 | Broderick et al. | 422/224 |
| 2002/0114749 | A1* | 8/2002 | Cole | 423/210 |
| 2003/0099585 | A1 | 5/2003 | Allgulin | 423/210 |
| 2003/0147793 | A1* | 8/2003 | Breen et al. | 423/210 |
| 2003/0161771 | A1 | 8/2003 | Oehr | |
| 2004/0013589 | A1 | 1/2004 | Vosteen et al. | |
| 2004/0144250 | A1* | 7/2004 | Neuroth et al. | 95/133 |

FOREIGN PATENT DOCUMENTS

| | | |
|---|---|---|
| CA | 2173271 | 2/1999 |
| DE | 3813 264 A1 | 11/1988 |
| DE | 41 23907 A1 | 1/1993 |
| DE | 44 22468 A1 | 1/1996 |
| EP | 1 225 967 B1 | 7/2002 |
| JP | 48026672 A | 4/1973 |
| JP | 51069483 | 6/1976 |
| JP | 59-216631 | 12/1984 |
| WO | WO 0126784 A1 | 4/2001 |
| WO | WO 02/096559 A1 | 5/2001 |
| WO | WO 03/093518 A1 | 11/2003 |

OTHER PUBLICATIONS

Jan. 20, 2003 print-out of E-watertechnologies' website at http://www.e-watertechnologies.com. regarding Whole House Reverse Osmosis System, 4 pages.
Jan. 20, 2003 print-out of Wholly Water® website at http://www.wholly-water.com regarding The Ultimate Drinking Water Purification System, 9 pages.
Jan. 20, 2003 print-out of Prostar Mechanical Technologies Ltd. website at http://www.prostar-mechanical.com regarding Water Purification Systems and Equipment, 4 pages.
Jan. 20, 2003 print-out of A1 Ultra Pure Drinking Water's website at http://www.a1ultrapure.com/drink.html regarding Drinking Water Systems, 8 pages.
Jan. 21, 2003 print-out of Apyron Technologies' website at http://www.apyron.com/home.html beginning with home page and including The Complete Arsenic Treatment Solution, 15 pages.
Jan. 20, 2003 print-out of USFilter website at http://www.usfilter.com/water regarding GFH™ Granular Ferric Hydroxide Media, 2 pages.
Jan. 20, 2003 print-out of Severn Trent Services at http://www.severntrentservices.com regarding SORB33, 2 pages.
Jan. 20, 2003 print-out of AD1 website at http://www.adi.ca regarding Arsenic Removal, 1 page.
Jan. 20, 2003 print-out of TRAMFLOC, Inc. website at http://www.tramfloc.com regarding Application of ActiGuard AAFS50 to Arsenic Removal, 3 pages.
Jan. 20, 2003 print-out of Waste Technolgoies of Australia Pty. Ltd. (Arsenic Solutions Information Page, Solutions and Resources) at http://www.arsenic-solutions.com regarding Simple Arsenic Removal Process (site under reconstruction), 2 pages.
Jan. 20, 2003 print-out of WRT website at http://wrtnet.com regarding The Z-33™ Arsenic Removal Process, 1 page.
Agion Antimicrobial, Agion Technologies L.L.C., The Most Advanced Antimicrobial Silver Delivery System, An Introduction, 10 page.
Bayer Corporation, Plastics Division, "Wheel Covers, Center Caps Become Revolving Art Forms With New Film Insert Molding Technology," 4 pages.
Brown, et al; "Mercury Measurement and Its Control: What We Know, Have Learned, and Need to Further Investigate;" J. Air & Water Manage. Assoc., pp. 1-97; Jun. 1999.
Gash, et al; "Efficient Recovery of Elemental Mercury from Hg(II)-Contaminated Aqueous Media Using a Redox-Recyclable Ion-Exchange Material;" Environ. Sci. Technol. 1988, 32, 1007-1012.
Dorhout and Strauss; "The Design, Synthesis, and Characterization of Redox-Recyclable Materials for Efficient Extraction of Heavy Element Ions form Aqueous Waste Streams;" 1999 American Chemical Society, pp. 53-68.
Rose, Arthur W., Hawkes, Herbert E., Webb, John S., "Geochemistry in Mineral Exploration," Second Edition, 1979, 3 pgs.
Maximum Separation Systems brochure, 7 pgs.
Maximum Product Information brochure, printed Apr. 14, 2000 from website http://www.amalgamseparators.com, 3 pgs.
Apr. 14, 2000 printout of ISOSEP® found at website http://www.drs.nl, 2 pgs.
Maximum Separation Systems, Inc. Model 2000 Type 4 Amalgam Separator brochure, 1 pg.
Metasys brochure, 2 pgs.
ADA Technologies, Inc. Final Progress Report Entitled "Cleanup Of Dental Amalgam Waste To Meet Sewer Discharge Regulations;" Grant No. 1 R43 ES07886-01, Apr. 28, 1997, 43 pgs.
Bindsley; "Dental Office Waste Stream Characterization Study;" Municipality of Metropolitan Seattle, Royal Dental College, Adv. Dent. Res. 6:125-130, Sep. 1991. 60 pgs.
Bill Johnson; Technical Memorandum on "Mercury Source Identification Uptate: Dental Office And Human Waste;" EIP Associates; Mar. 2, 1999, 25 pgs.
"Scientific Review of Issues Impacting Denistry;" Naval Dental Research Institute; vol. 2, No. 1, Jan. 2000. 5 pgs.
Pederson et al.; "The Removal of Mercury from Dental-Operatory Wastewater by Polymer Treatment;" Naval Dental Research Institute, Environmental Health Perspectives vol. 107, No. Jan. 1, 1999, 6 pgs.

Kümmerer et al.; "Mercury Emissions from Dental Chairs by Disinfection;" Institute of Environmental Medicine and Hospital Epidemiology, University Hospital Freiburg, *Chemosphere*, vol. 35, No. 4, pps. 827-833, 1997.

Fan et al.; "Environmental issues in dentistry—mercury*;" International Dental Journal (1997)47, 105-109. *Project Initiated and report approved by FDI Commission.

"Best Management Practices for Dental Waste;" City of Boulder Public Works/Utilities; 9 pgs.

Batchu et al., "Comparison of Particle Size Distributions of Dental Wastewater Under Various Clinical Procedures;" Naval Dental Research Institute Great Lakes, Illinois, 19 pgs.

Cailas et al., "Physico-chemical Properties of Dental Wastewater;" Water Environmental Federation, Chicago, Illinois, Oct. 1994, 11 pgs.

Arenholt-Bindsley and Larsen; "Mercury Levels and Discharge in Waste Water from Dental Clinics;" Waste, Air and Soil Pollution; 86:93-99, Jan. 1996, 8 pgs.

Letzel et al.; "An Estimation of the Size Distribution of Amalgam Particles in Dental Treatment Waste;" J. Dent.Res. 76(3): 780-788; Mar. 1997.

Listing of Abstracts from Int'l Conference "Arsenic in Bangladesh Ground Water: World's Greatest Arsenic Calamity," Feb. 22-28, 1999, 22 pgs.

EP "Arsenic in Drinking Water: Treatment Technologies for Arsenic Decision Tree, Variances and Exemptions," Jun. 2-3, 1999, 9 pages.

Driehaus, et al., "Granular ferric hydroxide—a new absorbent for the removal of arsenic from natural water," J. Water SRT—Aqua 47, 1998, abstract and pp. 59-68.

Murcott, Susan, Appropriate Remediation Technologies for Arsenic-Contaminated Wells, Massachusetts Institute of Technology, "Arsenic in Bangladesh Ground Water" Wagner College, Staten Island, New York, Feb. 27-28, 1999 13 pgs.

ADA Technologies, Inc., "Turnkey Arsenic Removal for Small Water Systems," Topic #AF03-265, Proposal #F031-0720, 3 pgs.

Stewart et al., "Stabilization of Radioactively Contaminated Elemental Mercury Wastes," DOE Spectrum 1998 Conference.

Sittig, 1973, Pollutant Removal Handbook: 286-294.

Grant et al., 1987, Grant & Hackh's Chemical Dictionary: 25, 29.

Barth, 1990, The SITE Demonstration of the CHEMFIX Solidification/Stabilization Process at the Portable Equipment Salvage Company Site: 166-170.

Huang et al., 1991, Emissions of Airborne Toxics from Coal-Fired Boilers: Mercury: 13-16.

Superfund Innovative Technology Evaluation, 1992.

Trezek, 1992, Remediation of Heavy Metals in Soils and Sludges: 1-5.

Darnell et al., 1992, Full-Scale Tests of Sulfur Polymer Cement and Non-radioactive Waste in Heated and Unheated Prototypical Containers: iii-A-8.

Blumbach et al., 1992, Sorbalit—A New Economic Approach Reducing Mercury and Dioxin Emissions: 2-20.

Hartenstein, 1992, A Fixed Bed Activated Coke/Carbon Filter as a Final Gas Cleaning Stage Retrofitted for a Hazardous Waste Incineration Plant—The First 6 Months of Operating Experience: 2-16.

Gorin et al., 1994, Final Disposal Options for Mercury/Uranium Mixed Wstes From the Oak Ridge Reservation: iii-21.

Daryl R., 1998, ADA Technologies, Inc. Memorandum.

1998, ADA Process for Stabilizing Radioactively Contaminated Elemental Mercury a Success, VIII (3): 1-4.

Brown, 2000, Stabilization of Mercury Containing Wastes.

2000, Soil Screening Guidance for Radionuclides: User's Guide: i-C-8.

Davis et al., Mercury Mixed Waste Treatment: 13-23.

Darco FGD Activated Carbon for Removal of Mercury and Dioxin From Flue Gas: 1-5.

Conley, Hg Working Group/Treatment Demonstrations [3PCK]: 1-4.

Broderick et al., Mercury Control and Treatment Processes for Solid, Liquid and Gas Streams.

Tyson, 1992, Treatability Study for the Amalgamation of a Radioactively Contaminated Elemental Mercury Waste at the Idaho National Engineering Laboratory.

Faulkner et al., Size Reduction: 132-162.

Roberts, et al., "Stabilization of Radioactively Contaminated Elemental Mercury Wastes," Paper No. 36-6, WM '98, Tucson, Arizona, Mar. 1-5, 1998.

"Appendix B: Arsenic and Clarifications to Compliance and New Source Contaminants Monitoring; Final Rule (66 FR 6976)"; *Environmental Protection Agency*; Aug. 2002; pp. 1-174.

"Arsenic Drinking Water"; *The National Academies Press*; 1999; 5 pp.

"Arsenic in Bangladesh Ground Water: World's Greatest Arsenic Calamity"; *International Conference*, Wagner College, Spiro Hall; Staten Island, NY, USA; Feb. 27-28, 1999; 32 pgs.

"Arsenic in Drinking Water; Treatment Technologies for Arsenic Decision Tree, Variances and Exemptions"; *Environmental Protection Agency*; Jun. 2-3, 1999; pp. 1-9; website: http://www.epa.gov/cgi-bin/epaprintonly.cgi.

"Arsenic Toxicity"; *Agency for Toxic Substances and Disease Registry*; Oct. 2000; pp. 1-42.

"Arsenic Treatment Technologies for Soil, Waste, and Water"; *US Environmental Agency*; Sep. 2002; pp. i- 16-4.

Balasubramanian et al.; "Arsenic Removal from Industrial Effluent through Electrocoagulation"; *Chem. Eng. Technol3.*; 2001, vol. 24, No. 5; pp. 519-521.

Chwirka et al.; "Removing Arsenic from Groundwater"; *Journal AWWA—Executive Summary*; Mar. 2000, vol. 92, No. 3, 2pp.; website:http://www.awwa.org/Communications/journal/Archives/j300es4.htm.

Davis; "Aqueous Silica in the Environment: Effects on Iron Hydroxide Surface Chemistry and Implications for Natural and Engineered Systems"; *Master's Thesis, Virginia Polytechnic Institute and State Univeristy*; May 9, 2000; pp. 1-30.

"Demonstration Project Summary: Arsenic Treatment Technology Demonstration"; *TAC, Montana University System Water Center*; Mar. 2001; 4 pp.

Driehaus et al.; "Granular Ferric Hyroxide—A New Absorbent for the Removal of Arsenic from Natural Water"; *J. Water SRT—Aqua*; 1998vol. 47, No. 1; pp. 30-35.

"EPA Needs More Stringent Standard for Arsenic in Drinking Water"; *US Water News Online*; Apr. 1999, 3 pgs.; website: http://www.uswaternews.com/archives/arcquality/9epanee4.htm.

Fields et al.; "Arsenic Removal from Drinking Water by Coagulation/Filtration and Lime Softening Plants"; *National Risk Management Research Laboratory, US Environment Protection Agency in Cincinnati*, OH; Jun. 2000; pp. i-96.

"Future Water Needs in Colorado"; *Colorado State Demographer*, 1994; 1 pg.; website: http://waterknowledge.colostae.edu/future.htm.

Hering et al.; "Arsenic Removal by Ferric Chloride"; *Journal AWWA*; Apr. 1996; pp. 155-167.

Kiura et al.; "Bactericidal Activity of Electrolyzed Acid Water from Solution Containing Sodium Chloride at Low Concentration, in Comparison with that at High Concentration"; *Journal of Microbiological Methods*; 2002, vol. 49, pp. 285-293.

Kraft et al.; "Electrochemical Water Disinfection Part I; Hypochlorite Production from Very Dilute Chloride Solutions"; *Journal of Applied Electrochemistry*; 1999; vol. 29, pp. 861-868.

Lepkowski; "Arsenic Crisis Spurs Scientists"; *C & EN*; May 17, 1999; pp. 45-49.

"List of Drinking Water Contaminants & MCLs"; *US Environmental Protection Agency*; (Last updated Mar. 18, 2004); pp. 1-12 and 1-6.

Mollah et al.; "Electrocoagulation (EC)—Science and Applications"; *Journal of Hazardous Materials*, B84 ; 2001, pp. 29-41.

Morita et al.; "Disinfection Potential of Electrolyzed Solutions Containing Sodium Chloride at Low Concentrations"; *J Viro Methods*; Mar. 2000; vol. 85(1-2): pp. 163-174.

Nolan; "National Statistical Analysis of Nutrient Concentrations in Ground Water"; URL: http://water.usgs.gov/nawqa/nutrients/datasets/nutconc2000/; 4 pgs.

"Proven Alternatives for Aboveground Treatment of Arsenic in Groundwater"; *US Environmental Protections Acency*; Oct. 2002; pp. 1-E-2.

"Public Health Statement for Arsenic"; *Agencry fo rToxic Substances and disease Registry*; Sep. 2000; 12 pgs.; website: http://www.atsdr.cdc.gov/ToxProfiles/phs8802.html.

Renk; "Treatment of Hazardous Wastewaters by Electrocoagulation"; *Colorado Hazardous Waste Management Society*; Nov. 6-7, 1989; 12 pgs.

Smith et al.; "Contamination of Drinking-Water by Arsenic in Bangladesh; A Public Health Emergency"; *World Health Organization*; 2000; pp. 1093-1103.

Welch et al.; "Arsenic in Ground-Water Resources of the United States"; *US Geological Survey*; May 2000; 4 pgs.

Woodwell et al.; "Water Efficiency for Your Home"; *Rocky Mountain Institute Institute 3$^{rd}$ Edition*; 1995; pp. 1-18.

R.K. Srivastava et al., "Flue Gas Desulfurization: The State of the Art," *J. Air & Waste Manag. Assoc.*, vol. 51, (Dec. 2001), pp. 1676-88.

Wylecial et al.; "The Activation of Sorbent in a Jet Mill in the Combusion-Gas Sulfur Removal Process"; *Technical University of Czestochowa*; (date unknown); pp. 1-6.

* cited by examiner

Final Amendment of Vermiclite

Basic Unit of Bentonite

Basic Unit of Vermiculite

Vermiculite in Alkali Conditions

CHEMICALLY-IMPREGNATED SILICATE AGENTS FOR MERCURY CONTROL

CROSS REFERENCE TO RELATED APPLICATIONS

The present application claims the benefits of U.S. Provisional Application Ser. No. 60/416,994, filed Oct. 7, 2002, of the same title to Lovell et al., which is incorporated herein by this reference. The subject matter of the present application is related to the subject matter of U.S. patent application Ser. Nos. 10/134,178, filed Apr. 26, 2002, and Ser. No. 10/600,117, filed Jun. 20, 2003, each of which is incorporated herein by this reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. 68-D-03-011, awarded by EPA.

FIELD OF THE INVENTION

The present invention is directed generally to mercury removal from fluids and specifically to mercury removal using ion-exchanged agents.

BACKGROUND OF THE INVENTION

In December, 2000, the U.S. Environmental Protection Agency (EPA) announced its intention to regulate mercury and other air toxic emissions from coal- and oil-fired power plants with implementation as early as November, 2007 (Johnson, J., "Power Plants to Limit Mercury," Chemical and Engineering News, 2001, p. 18,79). The pending regulation has created an impetus in the utility industry to find cost-effective solutions to meet the impending mercury emission standards.

Mercury and its compounds are a group of chemicals identified in Title III of the 1990 Clean Air Act (CAA) Amendments as air toxic pollutants. Mercury is of significant environmental concern because of its toxicity, persistence in the environment, and bio-accumulation in the food chain. Mercury is one of the most volatile species of the 189 toxic compounds listed in the Clean Air Act Amendments and is, therefore, released readily into the environment from natural and anthropogenic sources. Because of its physical and chemical properties, mercury can also be transported regionally through various environmental cycles (Mercury Study Report to Congress, "Volume VIII: An Evaluation of Mercury Control Technologies and Costs," U.S. Environmental Protection Agency, EPA-452/R-97; 0.010, December, 1997). Atmospheric deposition of mercury is reported to be the primary cause of elevated mercury levels in fish found in water bodies remote from known sources of this heavy metal.

Domestic coal-fired power plants emit a total of about fifty metric tons of mercury into the atmosphere annually—approximately thirty-three percent of all mercury emissions (Mercury Study Report to Congress, "Volume I: Executive Summary," United States Environmental Protection Agency, EPA-452/R-97-010, December, 1997; Midwest Research Institute, "Locating and Estimating Air Emissions from Sources of Mercury and Mercury Compounds," EPA-45/R-93-023, September, 1993). Specially designed emission-control systems maybe required to capture these volatile compounds effectively. A coal-fired utility boiler emits several different mercury compounds, primarily elemental mercury and speciated mercury, such as mercuric chloride ($HgCl_2$) and mercuric oxide (HgO)—each in different proportions, depending on the characteristics of the fuel being burned and on the method of combustion. Quantifying the rate and composition of mercury emitted from stationary sources has been the subject of much recent work (e.g., Devito, M. S. et al., "Flue Gas Hg Measurements from Coal-Fired Boilers Equipped with Wet Scrubbers," 92nd Annual Meeting Air & Waste Management Association, St. Louis, Mo., Jun. 21-24, 1999; Laudal, D. L. et al., "Bench and Pilot Scale Evaluation of Mercury Measurement Methods," DOE/EPRI/EPA Joint Workshop on Mercury Measurement and Speciation Methods, Research Triangle Park, NC, Jan. 29–30, 1997; Hargrove, O. W. et al., "Enhanced Control of Mercury by Wet FGD," proceedings of First Joint Power and Fuel Systems Contractors Conference, Pittsburgh, PA, Jul. 9–11, 1996; Agbede, R. O., A. J. Bochan, J. L. Clements, R. P. Khosah, T. J. McManus, "A Comparative Evaluation of EPA Method 29, the Ontario Hydro Method, and New Impinger Solution Methods for the Capture and Analysis of Mercury Species," proceedings of the First Joint Power and Fuel Systems Contractors Conference, Pittsburgh, Pa., Jul. 9–11, 1996). Mercury is found predominantly in the vapor-phase in coal-fired boiler flue gas (Mercury Study Report to Congress, "Volume VIII: An Evaluation of Mercury Control Technologies and Costs," United States Environmental Protection Agency, EPA-452/R-97-010, December, 1997). Mercury can also be bound to fly ash in the flue gas.

Today, only municipal solid waste (MSW) incinerators and medical waste combustors are regulated with respect to mercury emissions, and, until the present, the best available control technology for these incinerators is the injection of activated carbon. Although fairly effective for MSW incinerators, activated carbon is a less appealing solution for coal-fired flue gas streams because of the dramatic difference in mercury concentrations. Regulations for mercury control from municipal and medical waste incinerators specify eighty percent control, or outlet emission levels of fifty micrograms per cubic meter ($\mu g/m^3$). In coal-fired flue gas streams, typical uncontrolled mercury concentrations are on the order of 10 $\mu g/m^3$. For such low concentrations, projected injection rates for activated carbon to maintain ninety percent control of mercury emissions from coal-fired flue gas streams are high—up to 10,000 pounds or more of activated carbon to remove one pound of mercury, depending on the concentration and speciation of mercury in the flue-gas. The mercury-contaminated carbon becomes part of the ash collected by particulate-control devices and can convert the fly ash from an asset to a liability.

At present, the injection of activated carbon is broadly considered the best available control technology for reduction of mercury emissions from coal-fired power plants that do not have wet scrubbers (about seventy-five percent of all plants). Tests of carbon injection, both activated and chemically impregnated, have been reported by several research teams: Miller, S. J., et al., "Laboratory-Scale Investigation of Sorbents for Mercury Control," paper number 94-RAI14A.O1, presented at the 87th Annual Air and Waste Management Meeting, Cincinnati, Ohio, Jun. 19–24, 1994; Sjostrom, S., J. et al., "Demonstration of Dry Carbon-Based Sorbent Injection for Mercury Control in Utility ESPs and Baghouses," paper 97-W A 72A.O7, 90th Annual Meeting of the Air and Waste Management Association, Toronto, Ontario, Canada, Jun. 8–13, 1997; Bustard, C. J. et al., "Sorbent Injection for Flue-gas Mercury Control," presented at the 87th Annual Air and Waste Management Meeting, Cincinnati, Ohio, Jun. 19–24, 1994; and Butz, J. R. et al., "Use of sorbents for Air Toxics Control in a Pilot-Scale COHPAC Baghouse," 92nd Annual Meeting Air & Waste Management Association, St. Louis, Mo., Jun. 21–24, 1999. Activated carbon injection ratios for effective mercury control are widely variable and are explained by the dependence of the sorption process on flue gas temperature and mercury speciation and also on fly ash chemistry.

The effectiveness of carbon injection for mercury control is limited by sorbent capacity and flue-gas interactions with the activated carbon. Studies reported by Miller, S. J. et al., in "Mercury Sorbent Development for Coal-Fired Boilers," presented at Conference on Air Quality: Mercury, Trace Elements, and Particulate Matter, McLean, Virginia, December 1998, at the University of North Dakota's Energy & Environmental Research Center (EERC) examined the effects of various acid gas constituents on the sorption capacity of carbon in a full-factorial test matrix. The EERC workers fed elemental mercury through carbon samples and systematically changed the gas composition. They noted a limited impact by $SO_2$, but a dramatic drop in capacity when HCl or $NO_2$ were present with $SO_2$. Similar results were obtained in studies in a mercury test fixture by one of the applicants (Turchi, C., "Novel Process for Removal and Recovery of Vapor-Phase Mercury," Final Report for Phase II, DOE Contract DE-AC22-95 PC95257, Sep. 29, 2000).

The cost to implement activated carbon mercury control systems has been estimated by the Department of Energy (DOE), EPA, and several researchers. Chang, R. et al., in "Mercury Emission Control Technologies," Power Engineering, November, 1995, pp. 51–56, state that with operating and amortized capital costs, carbon injection will cost between $14,000 and $38,000 per pound of mercury removed, which equates to over $4 million per year for a 250-megawatt (MW) power plant.

EPA estimated similar costs for a 975-MW power plant (Mercury Study Report to Congress, "Volume VIII: An Evaluation of Mercury Control Technologies and Costs," U.S. Environmental Protection Agency, EPA-452/R-97-010, December, 1997). In their model, four mercury control scenarios were considered to achieve ninety percent reduction in mercury emissions for a plant with an existing ESP. The scenarios were: (1) activated carbon injection; (2) spray cooling and activated carbon injection; (3) spray cooling, activated carbon injection with added fabric filter collection device; and (4) added activated carbon filter bed. The most economical control option employed spray cooling with carbon injection, resulting in a specific cost of $14,000 per pound mercury removed.

The development of more efficient sorbents would greatly reduce the cost of this mercury control approach by decreasing the amount of sorbent injected, downsizing sorbent injection equipment, and reducing costs for handling and disposing of spent sorbent.

The potential limitations of carbon-based sorbents have led to research into other possible mercury sorbents. Research has demonstrated that noble-metal-impregnated alumina will remove elemental mercury and mercuric chloride from air streams. The sorbent can be thermally regenerated and the desorbed mercury captured in a condenser or oxidizing wet scrubber. Initial cost estimates looked attractive compared with the cost of disposable carbon sorbents (Turchi et al., "Removal of Mercury from Coal Combustion Flue-Gas Using Regenerable Sorbents," 92nd Annual Meeting Air & Waste Management Association, St. Louis, Mo., Jun. 21–24, 1999). In 1998 and 1999, work at coal-combustion facilities in Pennsylvania and New Jersey demonstrated that the sorbent can function in flue-gas but at lower efficiency than was seen in the earlier laboratory tests. Subsequent lab work has suggested that acid-gas attack on the sorbent will reduce its effectiveness. There is also some indication of flue-gas interactions similar to those witnessed by the EERC group. Research is continuing to determine whether the detrimental effects are temporary or permanent. Fixed beds of zeolites and carbons have been proposed for a variety of mercury-control applications, but none has been developed specifically for control of mercury in coal flue-gas. Products in this class include Lurgi GmbH's (Frankfurt, Germany) Medisorbon and Calgon Carbon Corporation's (Pittsburgh, Pa.) HGR. Medisorbon is a sulfur-impregnated zeolite and costs –$17/lb. As with most sulfur-impregnated materials, Medisorbon loses sulfur when heated above 2000 F, due to the vapor pressure of sulfur.

Examples of other mercury sorbents are discussed in Sugier et al. in U.S. Pat. No. 4,094,777. Sugier et al. discloses a process for removing mercury from a gas or liquid. This invention is limited in that it requires impregnation of a support only with copper and silver, although other metals can be present, for example iron. Moreover, the supports taught by the reference are limited to silica; alumina, silica-alumina, silicates, aluminates and silico-aluminates. The reference also teaches that incorporation of pore-forming materials during production of the supports is necessary because only relatively large absorption masses are envisioned, e.g., alumina balls. Because only large absorption masses are taught, only a fixed bed reactor is taught for contacting the gas with the absorption masses, as would be appropriate for natural gas or electrolytic hydrogen decontamination, which are the disclosed uses of the process.

Ambrosini et al. in U.S. Pat. No. 4,101,631 discloses a process for selective absorption of mercury from a gas stream. This invention is limited in that it involves loading a natural or synthetic, three-dimensional, crystalline zeolitic aluminosilicate (zeolite molecular sieve) with elemental sulfur before the zeolite molecular sieve is contacted with the gas stream. Metal sulfides are not present in the zeolite molecular sieve when it is contacted with the gas stream. The use of pellets in absorption beds is disclosed.

Chao in U.S. Pat. No. 4,474,896 discloses adsorbent compositions for the adsorption of mercury from gaseous and liquid streams. The invention is limited in that the absorbent compositions must contain polysulfide species, while sulfide species may optionally also be present. Disclosed support materials are carbons, activated carbons, ion-exchange resins, diatomaceous earths, metal oxides, silicates, aluminas, aluminosilicates, with the most preferred support materials being ion-exchange resins and crystalline aluminosilicate zeolites that undergo a high level of ion-exchange. Metal cations appropriate for ion-exchange or impregnation into the support material are the metal cations of antimony, arsenic, bismuth, cadmium, cobalt, copper, gold, indium, iron, iridium, lead, manganese, molybdenum, mercury, nickel, platinum, silver, tin, tungsten, titanium, vanadium, zinc, zirconium and mixtures thereof. Because polysulfides are a required element of the disclosed compositions, disclosed composition production methods include use of a sulfane, heating sulfur and a sulfide-containing support material. The only forms of adsorbent compositions disclosed were ¹⁄₁₆-inch pellets.

Gash et al., in "Efficient Recovery of Elemental Mercury from Hg(II)-Contaminated Aqueous Media Using a Redox-Recyclable Ion Exchange Material," Environ. Sci. Techno., 1998, pp. 1007–1012, 32(7), American Chemical Society, discloses the use of lithium-intercalated transition metal dichalcogenides as redox-recyclable ion-exchange materials for the extraction of heavy metal ions from water. The reference also discloses a semisynthetic ion-exchange material named thiomont, which is a thioalkylated montmorillonite clay. This reference is limited in that is does not disclose compositions of the type disclosed herein and the compositions that it does disclose can only be used in water treatment.

Dorhout et al., in "The Design, Synthesis, and Characterization of Redox-Recyclable Materials for Efficient Extraction of Heavy Metal Ions from Aqueous Waste Streams," in New Directions in Materials Synthesis, Winter, C. H., Ed., ACS Symposium Series 727, 1999, pp. 53–68, American Chemical Society, discloses the synthesis and use of lithium-intercalated transition metal disulfides as redox-recyclable materials for the extraction of heavy metals from aqueous waste streams. This reference is limited in that is does not disclose compositions of the type disclosed herein and the compositions that it does disclose can only be used in water treatment.

U.S. patent application Ser. No. 10/134,178, filed Apr. 26, 2002, discloses ion exchanged silicate substrates. The plate-like substrates support thin layers of metal sulfides between the plates. The polyvalent metals in the metal sulfides are typically derived from one or more polyvalent metals in the transition series of the Periodic Table of the Elements. The sorbent is manufactured by conducting the ion exchange between the polyvalent metal and the ion exchange sites in the substrate under acidic conditions. Following ion exchange, the substrates are washed to remove the acid and stabilized using a sulfide source under alkaline conditions. Although the sorbents have proven highly effective in removing mercury, whether in elemental or speciated form, the process to produce the sorbent can be expensive. The use of acidic conditions typically requires more expensive equipment than alkaline conditions and the transition from acid to alkaline conditions causes consumption of acid, thereby increasing reagent costs.

SUMMARY OF THE INVENTION

These and other needs are addressed by the various embodiments and configurations of the present invention. The present invention is generally directed to the use of polyvalent metal sulfides on substrates to remove various contaminants, particularly mercury, from contaminated fluids.

In one embodiment, a contaminant removal agent or particle is provided that includes:

(a) a substrate having an ion exchange capacity of about 50 mEq/100 g or higher and pH dependent and pH independent ion exchange sites; and (b) polyvalent metal sulfides located at each of the pH dependent and pH independent ion exchange sites. The metal sulfides are preferably one or more compounds of copper and sulfur with copper sulfide (CuS) being preferred. The presence of polyvalent metal sulfides not only on the less contaminant accessible, interlayer positioned pH independent ion exchange sites but also on the more contaminant accessible, edge, surface, and corner positioned pH dependent ion exchange sites can provide an agent having superior kinetics for removing contaminants, particularly mercury.

The substrate preferably has an ion exchange capacity ranging from about 80 to about 150 mEq/100 g and more preferably is a silicate, such as a member of the phyllosilicate group (e.g., vermiculite or montmorillonite) or the zeolite group.

In another embodiment, a process is provided for manufacturing the agent. The process includes the step of contacting a solution including dissolved polyvalent metal ions with the substrate at a pH that is typically greater than the $pH_{ZPC}$ to provide the ion exchanged substrate, where ZPC refers to the zero point of charge. As will be appreciated, at pH's above the $pH_{ZPC}$, pH dependent sites are negatively charged, below the $pH_{ZPC}$ pH dependent sites are positively charged, and at the $pH_{ZPC}$ pH dependent sites are uncharged. Due to the solubility limitations imposed by pH's above the $pH_{ZPC}$ (which are typically alkaline), the polyvalent metal is in the form of a compound that is soluble under alkaline conditions. Preferably, the polyvalent metal in the solution is complexed with ammonia. The solution is typically formed by contacting a salt of the polyvalent metal with an excess amount of ammonia.

The ion exchanged polyvalent metal (which is typically deposited as a compound or complex of the polyvalent metal and ammonia) can be instable after deposition. To stabilize the polyvalent metal, a source of sulfide ions is preferably contacted with the ion exchanged substrate to convert the polyvalent metal into a stable compound of the polyvalent metal and sulfur. Because the polyvalent metal ions are ion exchanged for the existing metal ions, the polyvalent metal sulfides are commonly discontinuously distributed over the substrate surface and are not in the form of a continuous coating or layer over the substrate surface.

The present invention can have a number of advantages compared to the conventional additives. For example, the agents can provide improved and cost effective control of mercury and other toxic metal ions in fluids, including both liquids and gases. The agents of the present invention can have capacities to sorb toxic ions that greatly exceed that of current sorbents at a much lower unit cost. This is believed to be due, at least in part, to the agent's ability to sorb ions by several different mechanisms and due to the use not only of pH independent but also pH dependent sites. The increased capacity combined with an economically efficient method of deploying the polyvalent metal sulfides can offer the prospect of much more cost effective methods of toxic metal control for any facility that may require such control including, without limitation, coal-fired utilities, municipal waste incinerators, municipal water districts, small private suppliers, and point-of-use systems. Compared to conventional acidic ion exchange processes, the use of alkaline as opposed to acidic conditions during ion exchange can reduce operating and capital costs (due to the avoidance of acid consumption and the ability to use low cost processing equipment) and provide increased safety to personnel. The use of silicate-based substrates can prevent adverse effects on the quality or value of the treated fluid caused by introducing undesirable ions. The use of a silicate substrate, such as vermiculite, can provide a particle bed that has a very large surface area but creates a low back pressure. The agents can remove not only speciated mercury but also elemental mercury from mercury-contaminated gases and liquids, without costly and time consuming pre-oxidation or reduction. They can operate effectively on liquids having high TDS. They can be relatively pH-insensitive and can operate effectively within the pH range of groundwater without prior pH adjustment.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
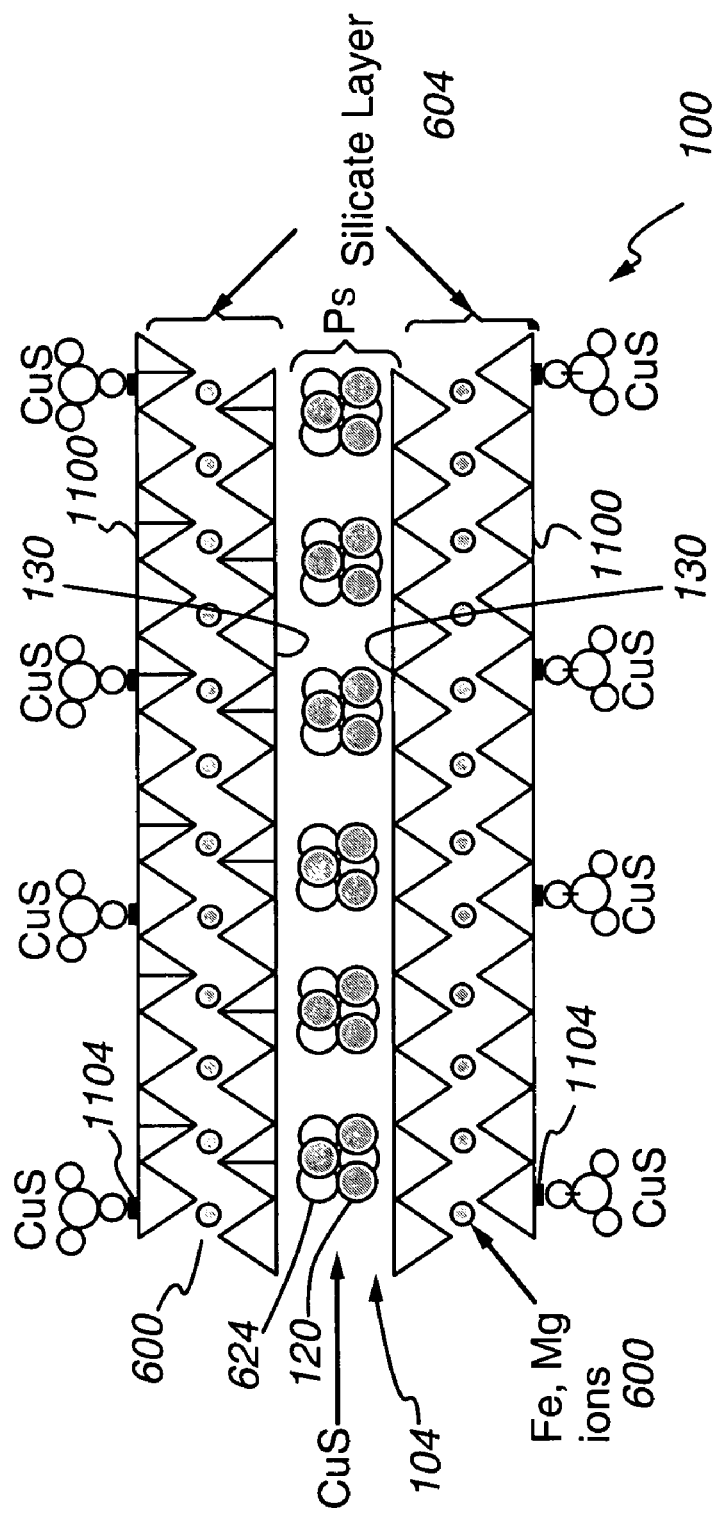
FIG. 1 is a cross-sectional view of adjacent plates of a vermiculite substrate (not drawn to scale) according to an embodiment of the present invention.

The present invention uses a polyvalent metal sulfide-containing contaminant removal agent to remove contaminants from fluids, particularly gases and aqueous streams. As will be appreciated, the term "sulfide" refers to a compound in which one or more metal atoms is bonded to one or more sulfur atoms. The agent includes a suitable substrate on which is deposited/substituted the polyvalent metal sulfides by suitable techniques. Gas-phase contaminants are believed to be collected on the agent by one or more mechanisms, namely co-precipitation, adsorption, surface complex formation, ion exchange, chemisorption, and penetration, (i.e., intercalation) of the crystal lattice formed by the polyvalent metal sulfides. These mechanisms are individually and collectively referred to as "sorption" and are discussed more fully below. Liquid-phase contaminants may also be removed by precipitation as sulfides. It is believed that the sulfides in the agent are slightly soluble in aqueous solutions at acidic, neutral or slightly alkaline pHs (or at pH's less than about pH 8). The solubilized sulfides would cause contaminants such as mercury to precipitate as mercury sulfides.

The substrate can be any suitable substrate depending on the application. Preferably, the substrate is selected such that it is inert, does not introduce significant amounts of undesirable (toxic) contaminants, such as extraneous ions (other than hydroxyl and hydrogen ions), into the fluid being treated, has a high ion exchange capacity, and has a large surface area per volumetric or mass unit of material. Preferably, the ion exchange capacity is at least about 50 mEq/100 g and more preferably ranges from about 80 to about 150 mEq/100 g or more, and the surface area is at least about 100 m²/g and more preferably ranges from about 500 to about 800 m²/g. Preferred substrates include the layered silicates, known collectively as phyllosilicates. These include clay minerals such as montmorillonites and micas, such as vermiculite. Phyllosilicates have a layered structure that leads to a high surface area. The substrate can also be non-layered silicates such as zeolites. Particularly preferred substrates include the minerals vermiculite and montmorillonite, with vermiculite being even more preferred.

In phyllosilicates, rings of silica tetrahedra are linked by shared oxygens to other rings in a two dimensional plane that produces a sheet-like structure. Typically, the sheets are then connected to each other by layers of cations. These cation layers are weakly bonded and often have water molecules and other neutral atoms or molecules trapped between the sheets. The silicon to oxygen ratio is generally 1:2.5 (or 2:5) because only one oxygen is exclusively bonded to the silicon and the other three are half shared (1.5) to other silicons. The symmetry of the members of this group is controlled chiefly by the symmetry of the rings but is usually altered to a lower symmetry by other ions and other layers; but the overlying symmetry of the silicate sheets will usually still be expressed in a higher pseudo-symmetry. The typical crystal habit of phyllosilicates is flat, platy, book-like and most all members display good basal cleavage. Although members tend to be soft, they are remarkably resilient. Phyllosilicates are also generally tolerant of high pressures and temperatures.

Vermiculite (i.e., hydrated laminar magnesium-aluminum-ironsilicate that resembles mica in appearance) is one preferred agent substrate, given its high ion exchange capacity, commercial availability, and low cost. Vermiculite is the name applied to a group of magnesium aluminum iron silicate minerals, with a variable composition that may be summarized thus:

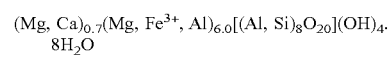

Flakes of raw vermiculite concentrate are micaceous in appearance and contain interlayer water in their structure. When the flakes are heated rapidly, or treated with hydrogen peroxide, the flakes expand, or exfoliate, into accordion-like particles. The resulting lightweight material is chemically inert, fire resistant, and odorless. For these reasons vermiculite will not adversely affect the quality of water that is exposed to it.

Figure 5:
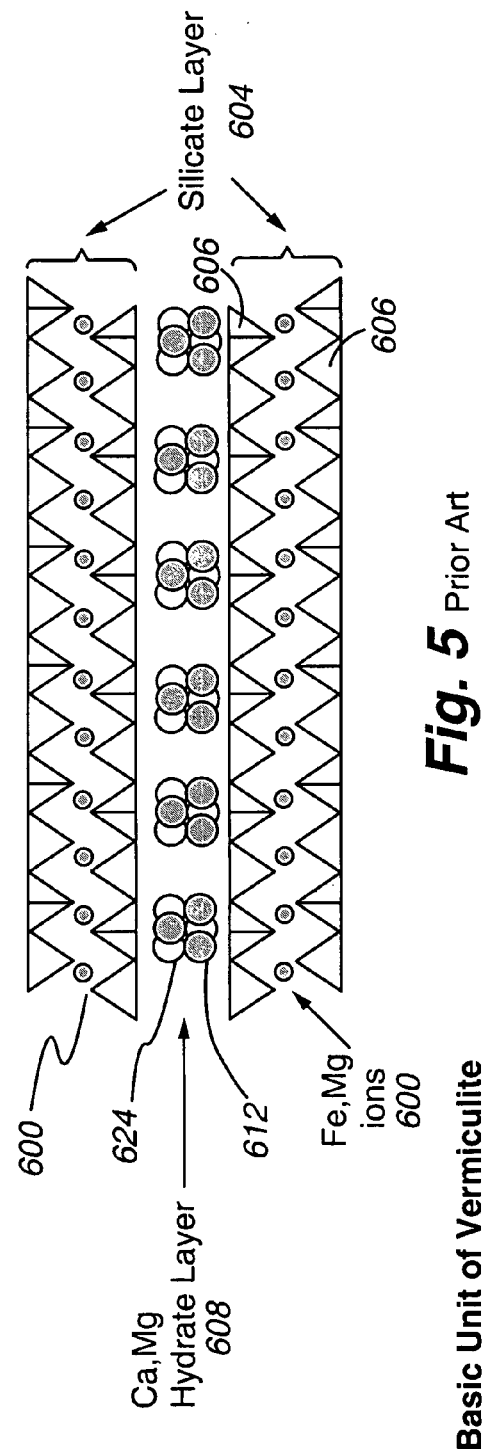
FIG. 5 is a prior art cross-sectional view of a naturally occurring vermiculite substrate (not drawn to scale)
Figure 10:
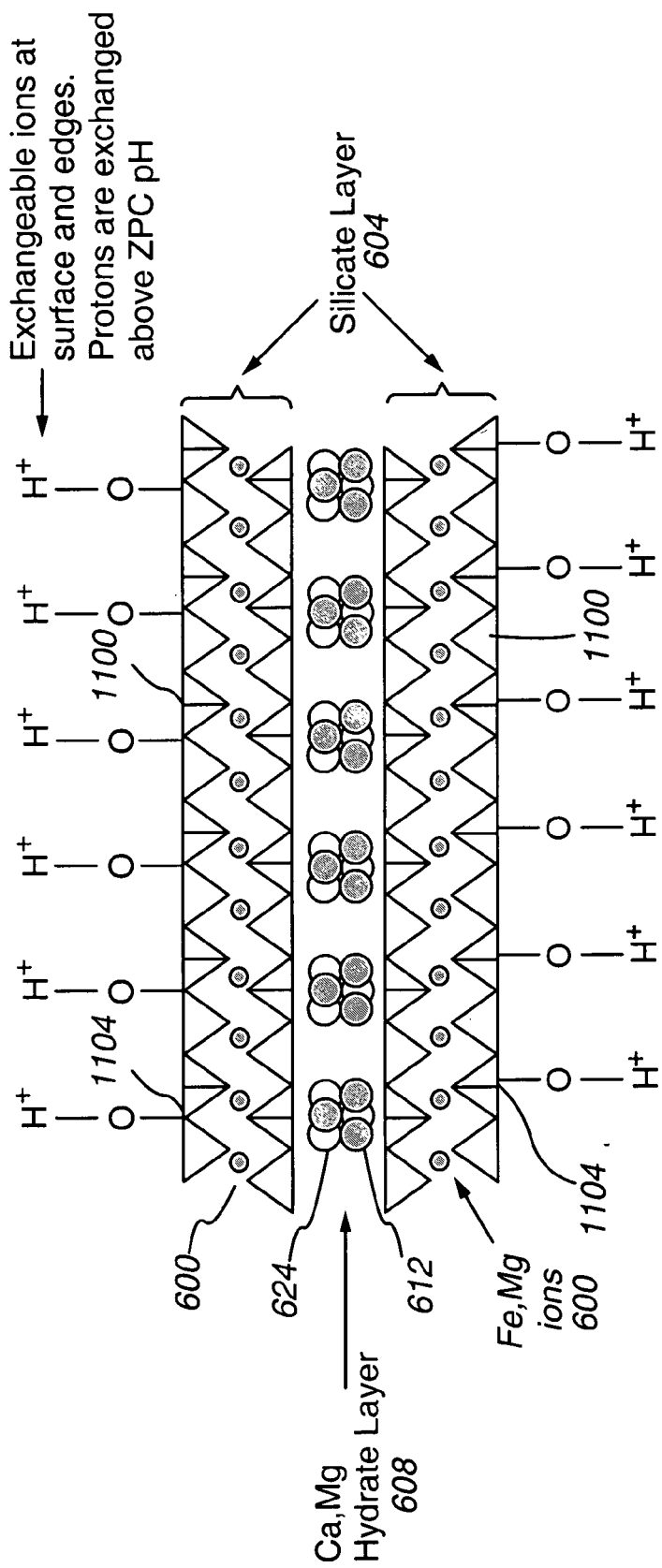
FIG. 10 is a cross-sectional view of a naturally occurring vermiculite substrate at a pH above the $pH_{ZPC}$.

FIG. 5 depicts the platelet structure of vermiculite. Vermiculate is a phyllo-, or layered, silicate with a generalized structure similar to that of talc. It has a central, octahedrally coordinated interlayer of iron and magnesium oxides 600 lying between two silicate layers 604 of, each silicate layer having inwardly pointing sheets 606 of silica tetrahedra. In vermiculite, iron and magnesium ions 600 substitute for silicon in the tetrahedral layer and the resulting electrical imbalance is neutralized by loosely bound hydrated interlayer 608 of ions 612 of calcium, magnesium, or more rarely, sodium or potassium (or ion exchange sites). The interlayer space 608 also includes two ordered layers of water molecules 624 (depicted as being behind the ions 612). Referring to FIG. 10, at pH's above $pH_{ZPC}$, the external, exposed surfaces 1100 and edges/corners (not shown) of the vermiculite also contain ion exchange sites 1104, which are typically occupied by hydroxyl ions. The calcium and magnesium ions within the interlayer space can be replaced by other metal ions, owing to vermiculites' very high ion-exchange capacity. Vermiculite is not described in the literature as an aluminosilicate.

Figure 9:
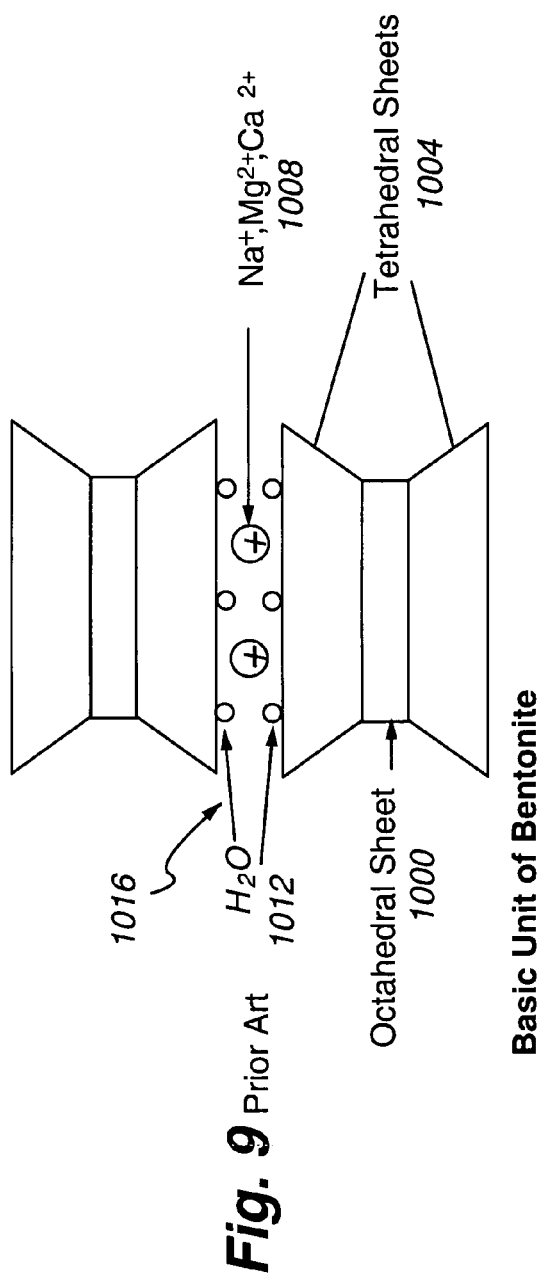
FIG. 9 is a cross-sectional view of a naturally occurring bentonite substrate (not drawn to scale)

Montmorillonite, also known as smectite, bentonite, or Fuller's Earth, is a clay weathering product of aluminosilicate minerals. These clays typically develop in semi-arid regions from solutions with high concentrations of magnesium ions and can be made synthetically. Montmorillonite is a crypto-crystalline aluminosilicate. As can be seen in FIG. 9, the individual plates of montmorillonite clays are constructed of a single sheet 1000 of alumina octahedra (or an octahedral sheet), sandwiched between two layers 1004 of silica tetrahedra (or tetrahedral sheets). Substitution of other atoms ($Mg^{2+}$, $Fe^{2+}$, or $Mn^{2+}$) for the aluminum in the octahedral layer or $Al^{3+}$ substitution for silicon in the tetrahedral layer leads to interlayer charge imbalance, producing one excess negative charge for each substituted atom. Cations 1008, such as calcium ion, magnesium ion, and sodium ion, intercalate into the interlayer areas to balance the charge. The charge imbalance in the interlayer region 1016 is permanent and is unaffected by the pH, the valance of the counter ions, and the electrolyte concentration of the surrounding aqueous solution. The balancing cations intercalate into the interlayer areas to balance the charge. Water molecules 1012 are also present in the interlayer areas.

The generalized formula of montmorillonite, though variable, is:

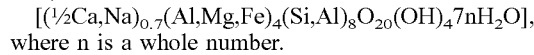

where n is a whole number.

The hydrated interlayer space 1016 between the sheets is expansible, that is, the separation between the individual smectite sheets varies depending upon the interlayer cations present. Because the interlayer area is hydrated, cations within the interlayer may easily exchange with cations in an external solution, providing that charge balance is maintained. This leads to very high cation exchange capacities in these materials that may be as high as 80–150 mEq/100 g. The availability of the interlayer areas and the very small particle size lead to these clays having extremely large effective surface areas.

Due to a low hydrological resistance when configured as a bed and a platy (high surface area) structure, vermiculite is generally the more preferred substrate.

The polyvalent metal located on the agent can be any suitable polyvalent metal, including the transition metals. Preferred polyvalent metals include the elements in Groups 9, 10, 11, and 12 of the Periodic Table of the Elements, with metals that form soluble complexes with ammonia being more preferred, cadmium, nickel, cobalt, silver, and copper being even more preferred, and non-toxic metals such as copper being even more preferred. The polyvalent metals are stabilized on the substrate by being converted into metal sulfides.

While not wishing to be bound by any theory, FIG. 1 depicts, on a microscopic level, a configuration of the agent of the present invention. The agent 100 includes a number of spaced stacked sheets 604 having surfaces 1104 and edges/corners (not shown). Between the adjacent pairs of layers 604 is a hydrated inter-layer region 104 including polyvalent metal sulfides 120 (or ion-exchange sites) and entrapped water molecules 624. Polyvalent metal sulfides 120 are also located at the ion exchange sites 1104 on the surface 1100 and edges/corners. Although not wishing to be bound by any theory, it is uncertain whether the polyvalent metal sulfides are bonded to the ion exchange sites by chemical bonds or by simple surface attachment forces, namely those between a precipitate and the surface on which the precipitate formed, or a combination of the two, that are not considered chemical bonds. The polyvalent metal sulfides are discontinuously distributed in the inter-layer region 104 and along the surface 1100 and edges/corners. The polyvalent metal sulfides provide a sufficient inter-plate spacing ($P_S$ (FIG. 1)) for contaminants to pass through the inter-plate region and collect on the polyvalent metal compounds. In other words, it is believed that the polyvalent metal sulfides "prop" open or maintain a desired inter-plate spacing distance.

The agent effectively collects both elemental and speciated mercury contaminants from the surrounding fluid. In the gas phase, mercury is a volatile metal and is preferentially attracted to sulfur atoms lining the interlayer spaces in the substrate.

While not wishing to be bound by any theory, the gas-phase contaminants, as noted above, are believed to be removed by one or more mechanisms, depending on the contaminate. For example, co-precipitation occurs when a contaminant forms a compound with a distinct chemical composition from ions in solution and the polyvalent metal amendment. The amount of contaminant that can be removed is stoichiometrically based on the amount of polyvalent metal on the agent. By way of illustration, the copper ion can form an amalgam with mercury. Adsorption occurs when a contaminant is held to the surface of the agent by physical bonds. The metal ions at the surface of a sulfide have a reduced coordination number, thus they behave as Lewis acids. In the presence of water, the surface ions first coordinate water molecules. The water molecules undergo dissociative chemisorption to form a protonated surface. The hydroxyl ions and protons at the surface of the sulfide are available for bonding or exchange with ions in solution. Moreover, sulfur atoms can form stable compounds with mercury with the interatomic bond being van der Waal-type forces. Surface complex formation is characterized by sorption followed by bidentate complex formation. Compared to co-precipitation, surface complex formation is not limited by stoichiometry in the amount of contaminant that can be removed. Ion exchange involves the exchange of ions between a solid and a solution. Finally, penetration of the crystal lattice refers to the insertion of metal ions into the crystal lattice structure of the polyvalent metal sulfides by occlusion.

Figure 2:
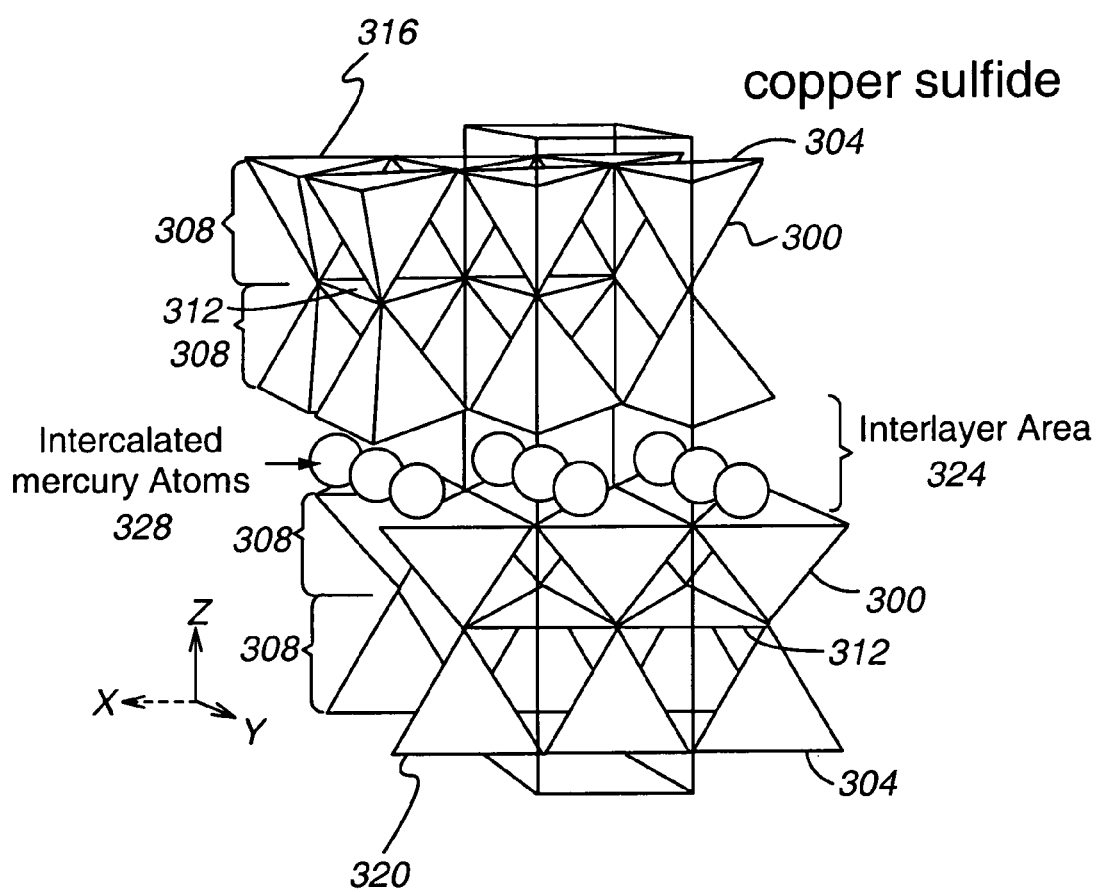
FIG. 2 is a cross-sectional view of copper sulfide demonstrating intercalated mercury atoms (not drawn to scale)

The intercalation mechanism is depicted by FIG. 2, where the polyvalent metal(s) (not shown), which in the figure is copper, is located in the center of the sulfur tetrahedrons 300. The tetrahedrons 300 are linked at their bases 304 to form thin tetragonal sheets 308. Some of the polyvalent metal(s) are combined with three sulfur ions in flat triangular groups 312 similar to the triangular groups of carbonates. The triangular groups 312 lie in a plane between adjacent tetragonal sheets 308. One or more of the tetragonal sheets are located on the adjacent plates interlayer surfaces 130 of the substrate (see FIG. 1). The rear surfaces 316 and 320 of the outermost copper sulfide tetragonal sheets 308 are each bonded to the opposing interlayer surfaces 130 of the plates (FIG. 1) in the substrate 100 in the interlayer area 104 (FIG. 1). In the intersheet area 324 between the outermost tetragonal sheets 308, mercury atoms 328 are intercalated. Typically, the average ratio of copper atoms to sulfur atoms is around 1:1, so that the copper sulfide is in the form of copper sulfide or CuS. As can be seen from FIGS. 1 and 2, phyllosilicates and copper sulfide have similar sheet- or plate-like structures.

The process to form the agent of the present invention will now be described with reference to FIGS. 2–6. Although any suitable technique for forming the agent may be employed, a preferred process chemically deposits and/or substitutes the polyvalent metal sulfides onto or into the substrate. For economic efficiency, the sulfides are deposited onto the substrate in such a manner as to ensure maximal exposure of the sulfide to the ions in the fluid while substantially minimizing the amount of the more expensive amendment required.

Referring to FIG. 1, it can be seen that polyvalent metal sulfides are located not only in the interlayer ion exchange sites but also in the ion exchange sites 1104 on the surface 1100 and edges/corners of the layers 604. While the ion exchange sites in the interlayer region 104 are pH independent, the ion exchange sites 1104 on the more exposed (and more contaminant accessible) surface 1100 and edges/corners are pH dependent. As discussed below, the ion exchange capacity of the pH dependent sites depends on the surface charge on the substrate 100 while the ion exchange capacity of the pH independent sites is independent of the surface charge. The availability of ion exchanged sites on the edges and corners in addition to the interlayer region can enhance substantially the contaminant removal efficiency relative to existing mercury sorbents, such as those of copending U.S. patent application Ser. No. 10/134,178 above in which ion exchange is performed only in the interlayer region due to the use of acid and not alkaline conditions during ion exchange.

Figure 3A:
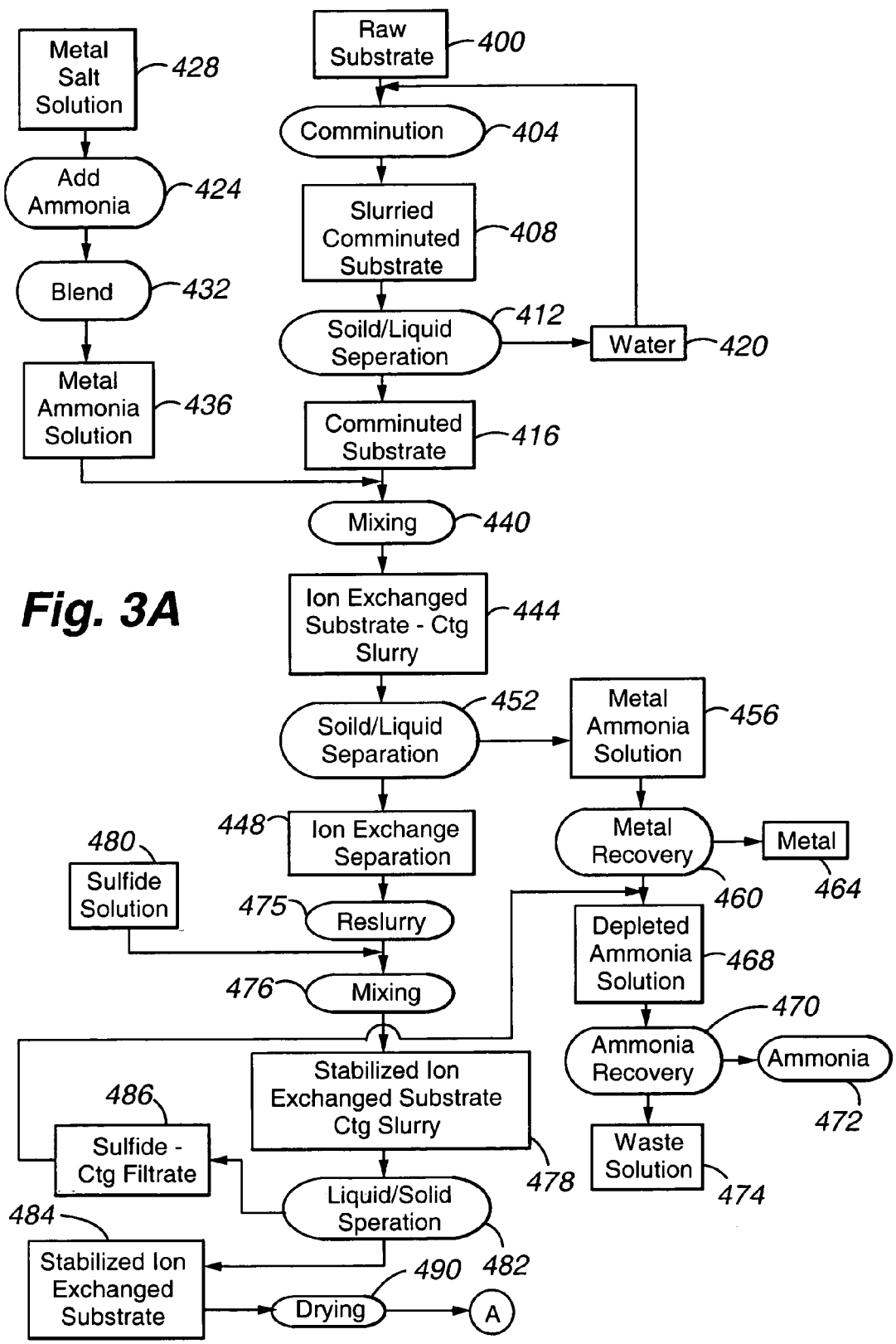
FIGS. 3A and B depict the steps for manufacturing a contaminant removal agent according to an embodiment of the present invention.
Figure 3B:
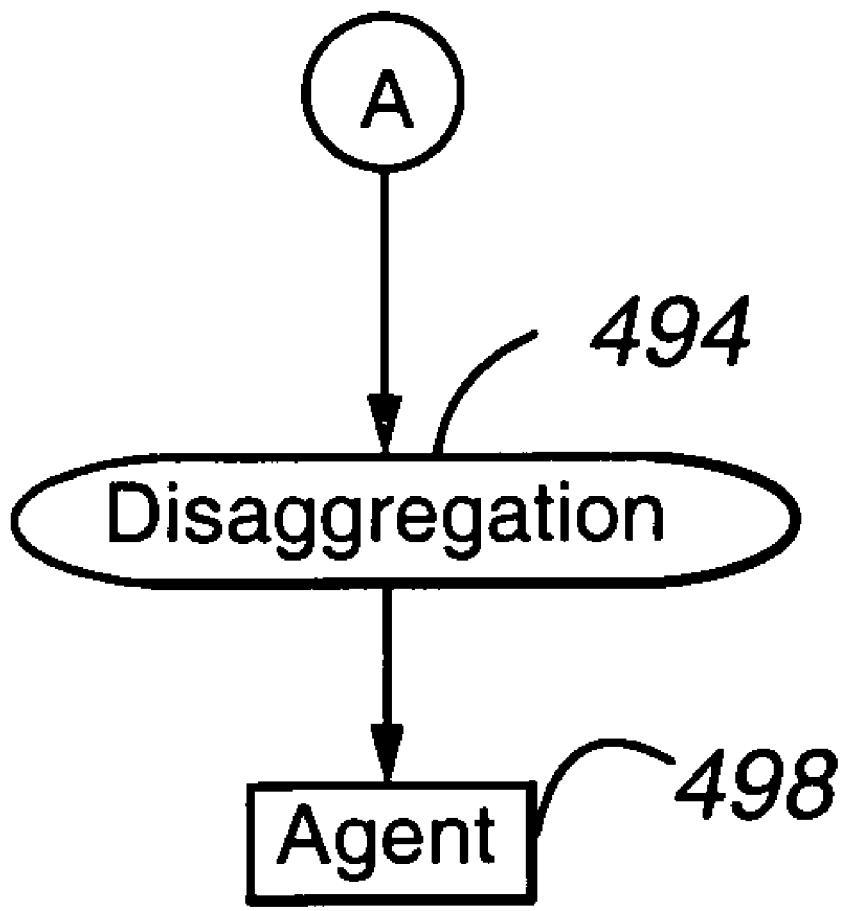
Figure 4:
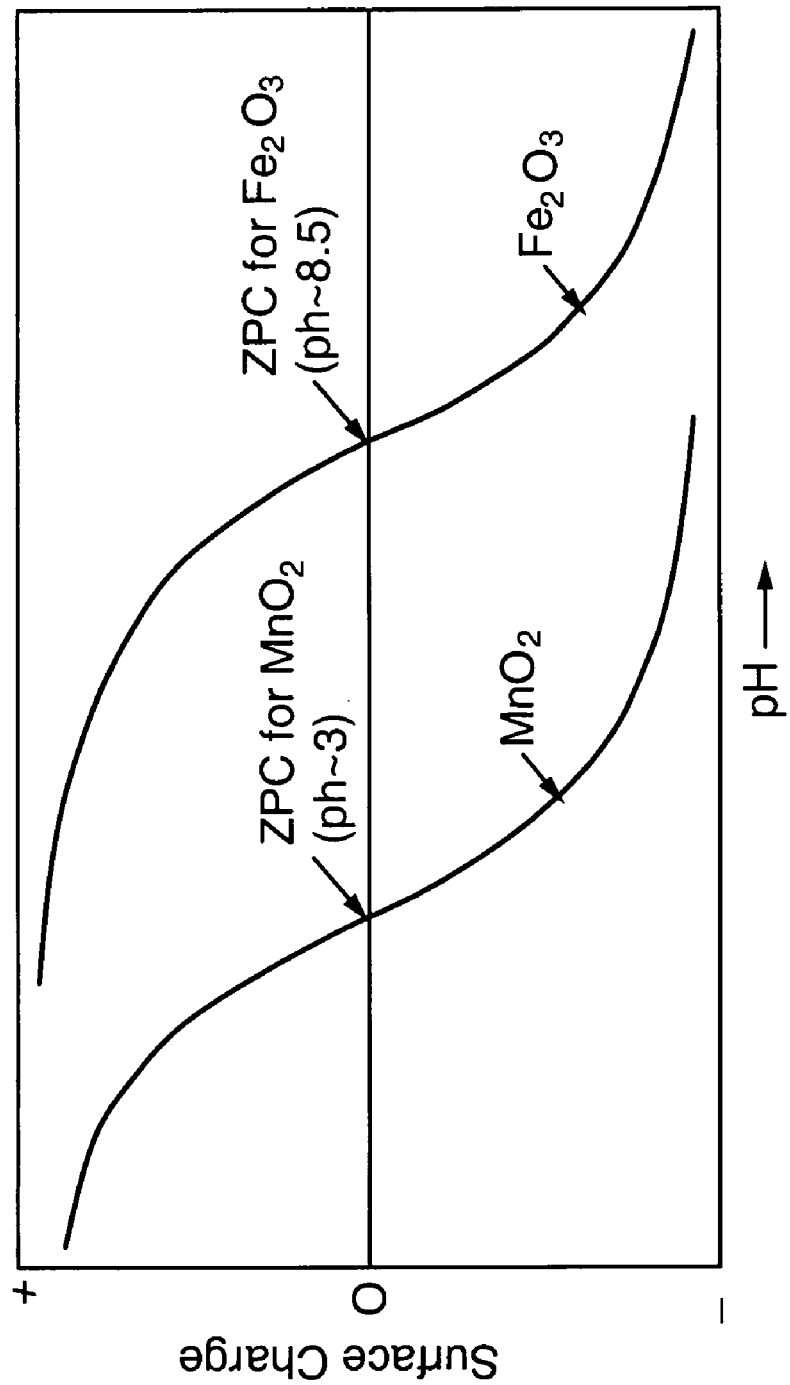
FIG. 4 is a prior art plot of surface charge against pH for Mn- and Fe-oxides.

Referring now to FIG. 3A, a raw substrate 400 is comminuted in step 404 by suitable techniques, such as by wet or dry crushing, wet or dry grinding, and the like, to form a slurried comminuted substrate 408. The slurried comminuted substrate 408 preferably has a P90 size of no more than about 10 microns.

In step 412, solid/liquid separation is performed to separate the comminuted substrate 416 from the water 420. Any suitable solid/liquid separation technique may be employed including filtering or centrifuging. The water 420 may be recycled to the comminution step 404.

In step 424, ammonia is added to a metal salt solution 428 and the mixture blended in step 432 to form a metal ammonia solution 436. The metal salt may be in any form, such as a chloride, sulfate, nitrate, and/or hydroxide. The concentration of the polyvalent metal in the metal salt in the metal solution 428 preferably ranges from about 2 to about 15 wt %, and the pH of the solution 428 from about pH 1 to about pH 2. Sufficient ammonia is added to the solution 428 to convert at least most of the polyvalent metal into a polyvalent metal-ammonia complex. As used herein, "polyvalent metal ammonia complex" includes any complex or compounds between the polyvalent metal cation and the ammonia ion, including without limitation the tetrammine copper complex and cuprammonium complex. When copper is the polyvalent metal, copper is initially precipitated as a copper hydroxide, and the solution turns opaque. Continued addition of ammonia redissolves the copper hydroxide and causes the solution to turn dark blue. Preferably, at least most, more preferably at least about 95% of the polyvalent metal in the metal ammonia solution 436 is in the form of a dissolved polyvalent metal-ammonia complex (such as tetrammine copper, or cuprammonium complexes). Typically, the concentration of the polyvalent metal-ammonia complex in the metal ammonia solution 436 ranges from about 1 to about 10 wt. %. The pH of the metal ammonia solution typically is at least about pH 7, and even more typically at least about pH 9, to about pH 10 to about pH 12.

In step 440, the comminuted substrate 416 is mixed and agitated with the metal ammonia solution 436 for a time sufficient to replace the existing metal cations 612 (FIG. 5) in the native substrate with desired polyvalent metal cations to form an ion exchanged substrate-containing slurry 444. Typically, sufficient metal ammonia solution 436 is added to produce a slurry in which the volumetric solid/liquid ratio is at least about 5%, more typically from about 10 to about 50%, and even more typically from about 10 to about 30%. The mixing and agitating can be done by any suitable technique, such as stirring, tumbling or pumping.

The concentration of the dissolved polyvalent metal-containing ions/compounds is super-equilibric relative to the concentration of the exchanged metal cations 612 in the salt solution. In this manner, the metal cations 612 are driven into solution and the polyvalent metal cations out of solution (to replace the metal cations 612) in an attempt to attain an equilibrium concentration of the metal cations 612 and polyvalent metal cations in the metal ammonia solution 436. As noted above, polyvalent metal ammonia complexes replace native cations at the interlayer (pH independent) ion exchange sites and protons at the surface (pH dependent) ion exchange sites. To realize substantially complete ion replacement of the native metal cations 612, the pH of the surrounding metal ammonia solution 436 is maintained at a level necessary to realize a substantially complete replacement of the native metal cations 612. Preferably, the duration of the mixing and agitating step 440 typically ranges from 1 to about 24 hours and more typically from about 2 to about 8 hours. Typically, at least about 90% of the native metal cations 612 are replaced by polyvalent metal cations.

The pH of the metal ammonia solution 436 and the slurried comminuted substrate 444 during the mixing step 440 can be important. In clay/aqueous systems, the potential of the clay surface is determined by the activity of ions that react with the mineral surface. The zero point of charge (ZPC) at the clay surface is the point at which the total charge from the cations and anions adsorbed onto the surface is zero. This is illustrated graphically by FIG. 4, which shows the relationship between surface charge and pH for manganese oxide and iron oxide. A similar graphical relationship exists for clays. The principal potential determining ions are protons and hydroxyl ions. The pH that corresponds to the ZPC is referred to as the $pH_{ZPC}$ or the isoelectric point. When the pH of the solution in contact with the clay is below the $pH_{ZPC}$, basal planes and edges and corners of the tetrahedral layers carry positive charges and exhibit an anion exchange capacity. At the $pH_{ZPC}$, the solid exhibits no ion exchange capacity and at a pH above the $pH_{ZPC}$, the basal planes of the silica tetrahedra are negatively charged and exhibit a cation exchange capacity.

Accordingly, clays, such as montmorillonite, exhibit two forms of exchange one of which is pH independent and one that is pH dependent. The $pH_{ZPC}$ of various substrates depends of course on the substrate. For example, the $pH_{ZPC}$ for montmorillonite is from about pH 2 to about pH 3.

The pH of the metal ammonia solution 436 immediately before the mixing step 440 and of the slurried comminuted substrate during the mixing step 440 is preferably above the $pH_{ZPC}$, more preferably at least about pH 7, even more preferably at least about pH 9, and even more preferably ranges from about pH 10 to about pH 12. At higher pH's, the ion exchange capacity is typically increased by at least about 80 to about 120% relative to ion exchange performed at pH's below the $pH_{ZPC}$.

Figure 6:
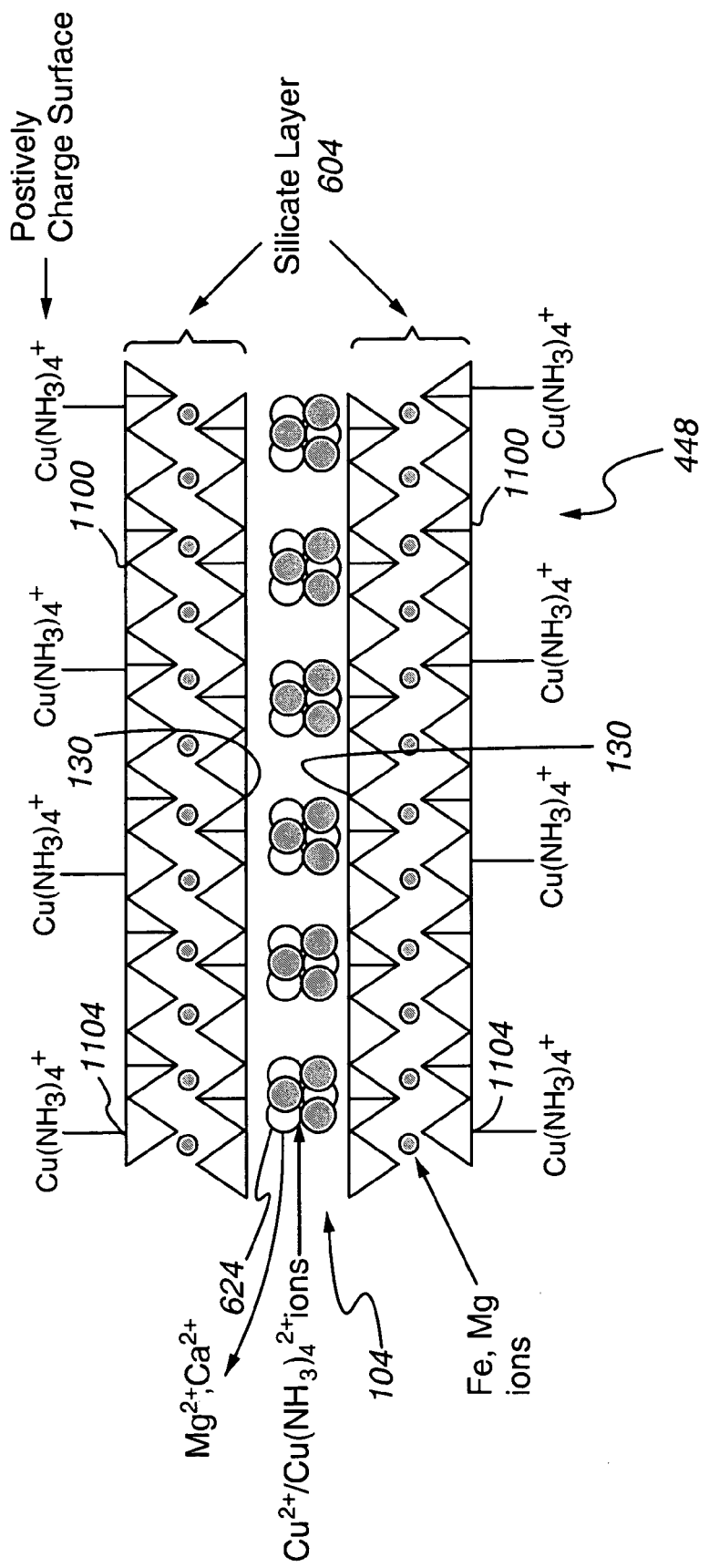
FIG. 6 is a cross-sectional view of the substrate after ion exchange (not drawn to scale)

FIG. 6 depicts the ion exchanged substrate 448. The substrate 448 comprises copper ions ($Cu^{++}$) and tetrammine copper complex ions $Cu(NH_3)_4^{++}$) exchanged for the cations 612 (FIG. 5) in the interlayer region 104 and tetrammine copper complex ions exchanged for the hydrogen ions (or protons) at ion exchange sites 1104. As will be appreciated, other compounds between copper and ammonia may be present at the ion exchange sites, such as diammine.

With the exception of the alkali metals, most metal ions precipitate from alkaline solutions as the hydroxides and oxides. Simple salts of the metal ions cannot therefore generally be used as a source of the exchangeable ions in alkaline conditions. However, certain metals form complex ions, which are soluble in alkaline solutions. Copper is an attractive alternative for this application as it forms a number of different complexes with ammonia and other soluble compounds such as pyridine. These complexes include $Cu(NH_3)$, $Cu(NH_3)_2$, $Cu(NH_3)_3$, and $Cu(NH_3)_4$. Copper is not a RCRA metal and therefore does not pose a toxicity issue. Other metals also form ammonia complexes, but in certain applications they are too toxic and/or expensive or the sulfides of the metals form three-dimensional structures, with little potential capacity for mercury. While not wishing to be bound by any theory, it is believed, as shown in FIG. 2, that copper sulfide has a two-dimensional layered structure with sheets being bonded by van der Waals forces, and the weak intersheet bonds permit mercury to intercalate into the intersheet spaces where the mercury is held by the sulfur and metal ions lining the opening.

The resultant ion exchanged substrate-containing slurry 444 (which includes the ion exchanged substrates 448 and the metal ammonia solution 436) are subjected in step 452 to liquid/solid separation, such as by pressure filtration, screening, settling, flotation, or centrifuging, to separate the ion exchanged substrates 448 from the ion exchanged solution 456 and the ion exchanged substrate 448. The recovered ion exchanged substrate 448 is rinsed to remove the excess ion exchanged solution 456.

The recovered metal ammonia solution contains exchanged native cations, such as those set forth above, and substantial amounts of the polyvalent metal and ammonia. In step 460, at least most of the polyvalent metal is recovered by suitable techniques, such as electrolysis and precipitation of the polyvalent metal (such as as a hydroxide or sulfide) to produce the recovered metal 464. The polyvalent metal depleted solution 468 in step 470 is subjected to ammonia recovery by suitable techniques. An example is to add a source of hydroxide ions to the solution 468 which precipitates the remaining dissolved polyvalent metal, regenerates the ammonia ion, and generates ammonia gas. The ammonia gas can be captured and condensed for reuse. Distillation of the ammonia may be used to enhance recovery. The recovered metal 464 is recombined and regenerated with fresh metal salt solution to form the metal salt solution 428 and recovered ammonia 472 regenerated with fresh ammonia and added to the metal salt solution 428 as noted above. The waste solution 474 may be discarded.

The ion exchanged substrates, in step 475, are reslurried and in step 476 contacted with a source of sulfide ions, such as sulfide solution 480, to yield the stabilized ion exchanged substrate-containing slurry 478 and subjected to further mixing/agitating by suitable techniques for a sufficient period of time for at least most, and typically about 95%, of the polyvalent metal cations on the substrates to be converted into sulfides. Sulfide precipitation will release the ammonia ions present in the polyvalent metal ammonia complexes back into solution. As will be appreciated, the polyvalent metals are volatile on the substrate unless stabilized by a suitable technique. The preferred technique is to convert the polyvalent metal into a sulfide, though other techniques may be employed. The source of sulfide ions may be any suitable compound, such as an alkali metal sulfide or polysulfide solution, an alkaline earth metal sulfide or polysulfide solution, a thiocarbonate solution, hydrogen sulfide gas, ammonium sulfide, and mixtures thereof.

The sulfide solution 480 typically contains a superstoichiometric amount of sulfide ions relative to the amount of polyvalent metal ions and has a pH of at least about pH 8 and more typically ranging from about pH 10 to about pH 12. Typically, the sulfide solution 480 contains at least about 2 wt. % and more typically from about 5 to about 20 wt. % of sulfide ion. A precipitate of the polyvalent metal ions forms immediately from the excess polyvalent metal ammonium ions carried over in the solution that is carried over from the solid/liquid separation step 452. Metal ions that have been exchanged into the lattice of the substrate also react to form the sulfide and become immobilized in place within the substrate such that, during fluid treatment, the metal ions do not enter solution. The agent of FIG. 1 results from this step when vermiculite is the substrate.

While not wishing to be bound by any theory, it is believed that the alkali or alkaline earth metals in the sulfide solution 480 are attracted by the substrate to balance the charge imbalance caused by the formation of copper sulfide. As will be appreciated, copper sulfide has a zero charge. The substrate has a negative charge. Accordingly when copper sulfide forms, the substrate will have a net negative charge where the copper sulfide is deposited. The alkali or alkaline earth metals have a positive charge and are believed to physically bond to the substrate to cause a zero net charge.

As will be appreciated, steps 475 and 476 can be performed simultaneously. The ion exchanged substrate can be slurried using the sulfide solution alone or in conjunction with an aqueous solution. The volumetric ratio of the sulfide solution 480 to the ion exchanged substrate 448 is typically from about 5:1 to about 10:1 to yield a solids content of the stabilized ion exchanged substrate-containing slurry 478 ranging from about 10 vol. % to about 20 vol. %. The pH of the sulfide solution during the mixing step preferably ranges from about pH 10 to about pH 12.

In step 482, the stabilized ion exchanged substrate 484 is separated from the residual sulfide solution 486 by liquid/solid separation techniques, such as those set forth above in connection with steps 412 and 452. The stabilized substrate 484 is dried in step 490 using a suitable dryer, such as a hollow flight dryer, porcupine dryer, spray dryer, and the like.

In step 494, the dried stabilized ion exchanged substrate is disaggregated to form the agent 498.

The recovered sulfide-containing filtrate 486 contains not only the sulfide ion source but also ammonia ions. The ammonia ions were typically part of a complex with the polyvalent metal. The recovered sulfide-containing filtrate 486 can be combined with the depleted ammonia solution 468 to cause polyvalent metal sulfide precipitation followed by ammonia recovery or independently subjected to extractive distillation to recover the ammonia.

The final product or agent 498 can be substantially different in color compared to the original substrate. For vermiculite as the substrate, the color is commonly substantially different but the vermiculite retains the luster of the original (native) material. This indicates that the polyvalent metal sulfides have been introduced into the structure of the vermiculite rather than being merely a surface coating.

Figure 7:
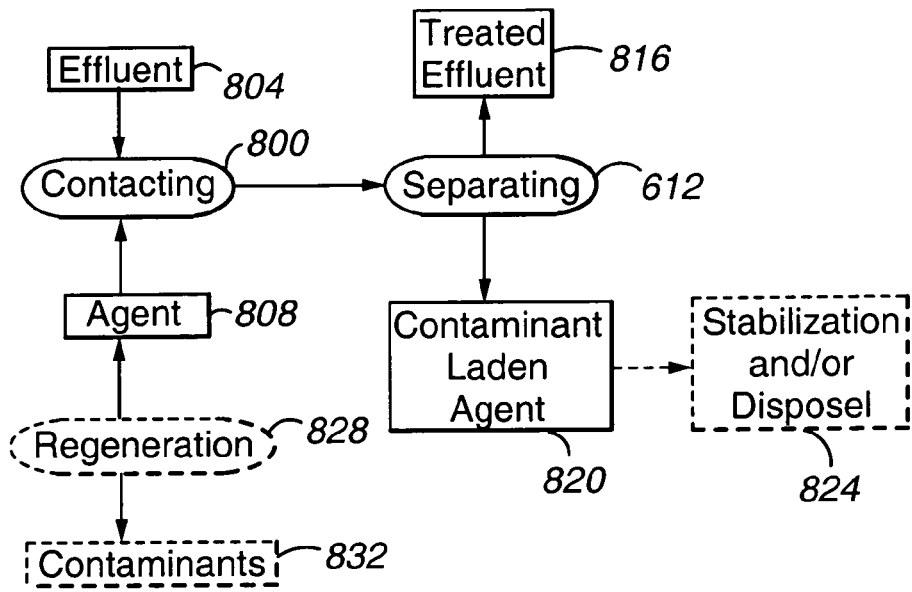
FIG. 7 depicts a process for treating a liquid according to an embodiment of the present invention.

Referring now to FIG. 7, the process for treating a fluid, such as water, is described. In step 800, the fluid 804 (which typically is a liquid having a pH ranging from about pH 5 to about pH 9) is contacted with the agent 498 in any suitable manner. Preferably, the fluid is passed through a fluidized or fixed bed of the agent particles. The particle size of the agent can be important in optimizing contaminant removal from liquids. For liquid treatment, the average particle size of the agent particles 498 is larger than about 60 mesh. A preferable range is from about 30 mesh to about 5 mesh. In step 612, the treated fluid 816 is separated from the contaminant laden agent 820 (or removed from the bed). The residence time of the fluid 804 in the contacting step 800 is typically at least a few tens of seconds, with at least about 120 seconds being preferred. After fluid treatment, the agent particles 808 eventually become laden with the contaminant 832 so as to be less effective in contaminant removal. The contaminant laden agent 820 can be stabilized in step 824 by known techniques, if needed, and disposed of. Alternatively, the agent can be regenerated in step 828 chemically or thermally by known techniques to remove the contaminants 832 and reused to treat further fluid.

Figure 8:
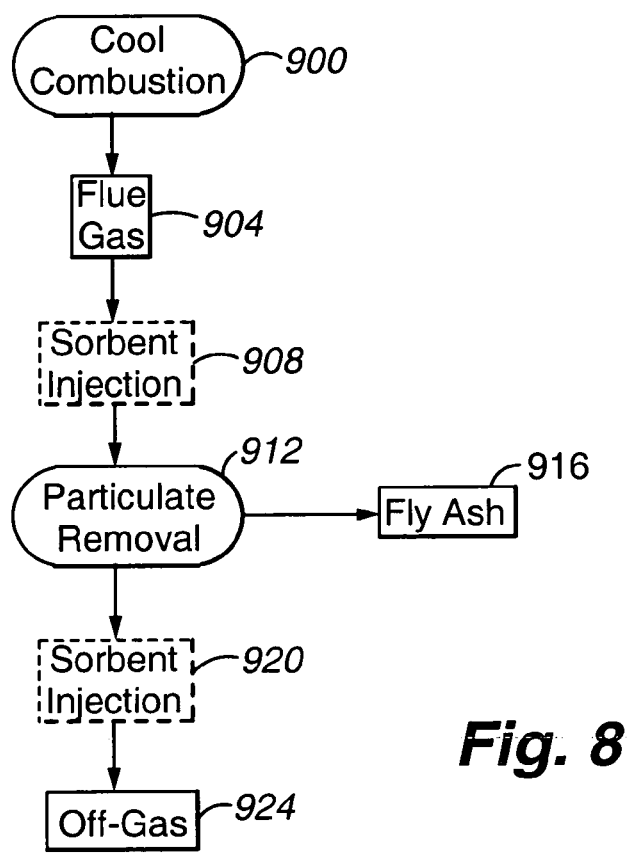
FIG. 8 depicts a process for treating a gas according to an embodiment of the present invention.

FIG. 8 depicts a process for treating a gas, particularly a mercury containing flue gas generated by the combustion of coal. The coal is combusted in step 900 to produce a flue gas 904. The flue gas 904 typically includes particulates, such as fly ash. The agent, which behaves as a sorbent, may be introduced into the flue gas in step 908 by suitable techniques, such as by injection. The preferred size of the agent particles is in the range of about 2 to about 10 microns to ensure adequate gas contact and distribution in the gas stream. In step 912, the entrained particulates, (which would include the agent particles) are removed by suitable techniques, such as by an electrostatic precipitator or baghouse, to produce recovered fly ash 916 and an off-gas. The off-gas may be contacted with the agent in step 920, such as noted above in step 908 or by passing the gas through a fluidized or packed bed of the agent, to produce an environmentally acceptable off-gas 924.

The amount of contaminant(s) removed from the fluid can be high. Preferably, at least about +90% of the contaminants are removed to provide a final contaminant concentration of no more than about 10% of the initial untreated concentration. In flue gas applications, the starting concentration of mercury in the gas stream is typically in the range of 2 to about 20 micrograms/m$^3$. Assuming that at least about 90% of the mercury is sorbed by the agent, the residual mercury concentration in the gas stream typically is 0.2 to 2 micrograms/m$^3$. Loadings of up to 12 milligrams of mercury by weight of the amended vermiculite have been realized.

EXAMPLE 1

This Example describes preparation of several polyvalent metal sulfide-substituted sorbents of the present invention, using various amounts of cuprammonium ion for substitution.

All steps in all Examples (unless otherwise noted) were carried out at room temperature. All reagents are obtainable from Sigma Chemical, St. Louis, Mo.) except as noted. To a beaker, approximately 20 milliliters (mL) of copper chloride, to give a final concentration of 2%, 5%, or 10% (w/v) of copper in 100 mL, was added. Following addition of copper chloride, enough ammonium hydroxide was added to dissolve the copper chloride. Distilled deionized water was then added to bring the solution to 100 mL total. See Table 1 for further experimental details. To the prepared cuprammonium reagent, 10 g of vermiculite Palabora #4 (obtainable from Palabora, Inc. Palabora, South Africa), ground or milled to 90% less than 10 micrometers, were weighed out and placed in each beaker to form a slurry. All substrates are pretreated before use by exfoliation (either by hydrogen peroxide treatment or heat treatment) and ground or comminuted to approximately 10 microns. The slurry was then rotated at approximately 50 rpm overnight. After incubation, the reaction was centrifuged in order to separate the liquid and the solid, and the liquid was removed for metal recovery. After the overnight reaction, the polyvalent metal was stabilized to yield stabilized ion-exchange substrate by resuspending the solid using a 10% aqueous solution of sulfide to form a slurry. In this Example, either sodium sulfide or CASCADE (calcium polysulfide, available from BSP, Inc., Fresno, Ca) was added, approximately 100 ml. The slurry was then centrifuged to separate the liquid and the solid. The solid was rinsed once with 100 mL distilled deionized water, and recentrifuged to remove liquid. The solid then consisted of a stabilized ion exchange substrate. The stabilized ion exchange substrates were then dried at 40° C. overnight.

TABLE 1

Preparation of cuprammonium solution at 2%, 5%, and 10% copper

| Formulation Number | % Copper in solution | Weight (g) CuCl added to solution | Moles copper | ml NH$_4$OH added |
|---|---|---|---|---|
| 1 | 2 | 4.23 | 0.031 | 10.5 |
| 1A | 2 | 4.23 | 0.031 | 10.5 |
| 2 | 5 | 10.6 | 0.0787 | 40 |
| 2A | 5 | 10.6 | 0.0787 | 40 |
| 3 | 10 | 21.15 | 0.1574 | 80 |
| 3A | 10 | 21.15 | 0.1574 | 80 |

EXAMPLE 2

This Example describes preparation of several polyvalent metal sulfide-substituted sorbents of the present invention, using various amounts of cuprammonium ion for substitution.

All steps described in Example 1 were carried out in this Example, with the exception being in the sulfide addition step. In this Example, either sodium sulfide or CASCADE (calcium polysulfide, available from BSP, Inc., Fresno, Ca) was added until the pH was above 8. The slurry was processed to completion as described in Example 1.

TABLE 2

Preparation of cuprammonium solution at 2%, 5%, and 10% copper

| Formulation Number | % Copper in solution | Weight (g) CuCl added to solution | Moles copper | ml NH$_4$OH added |
|---|---|---|---|---|
| 1 | 2 | 4.23 | 0.031 | 10.5 |
| 1A | 2 | 4.23 | 0.031 | 10.5 |
| 2 | 5 | 10.6 | 0.0787 | 40 |
| 2A | 5 | 10.6 | 0.0787 | 40 |
| 3 | 10 | 21.15 | 0.1574 | 80 |
| 3A | 10 | 21.15 | 0.1574 | 80 |

EXAMPLE 3

This Example describes preparation of several polyvalent metal sulfide-substituted sorbents of the present invention, using various amounts of cuprammonium ion for substitution.

All steps described in Example 1 were carried out in this Example, with the exception being in the sulfide addition step. In this Example, either sodium sulfide or CASCADE (calcium polysulfide, available from BSP, Inc., Fresno, Ca) was added as follows. When the amount of sulfide added was 126 mL, a final pH of 9.44 was recorded. When the amount of sulfide added was 132 mL, a final pH of 10.2 was recorded. The slurry was processed to completion as described in Example 1.

TABLE 3

Preparation of cuprammonium solution at 2%, 5%, and 10% copper

| Formulation Number | % Copper in solution | Weight (g) CuCl added to solution | Moles copper | ml NH$_4$OH added |
|---|---|---|---|---|
| 1 | 2 | 4.23 | 0.031 | 10.5 |
| 1A | 2 | 4.23 | 0.031 | 10.5 |
| 2 | 5 | 10.6 | 0.0787 | 40 |
| 2A | 5 | 10.6 | 0.0787 | 40 |
| 3 | 10 | 21.15 | 0.1574 | 80 |
| 3A | 10 | 21.15 | 0.1574 | 80 |

EXAMPLE 4

This Example describes a mercury sorption test to determine the mercury capacity of a stabilized ion exchange substrate of the present invention.

According to sources, mercury capacity of a sorbent as determined in a packed bed configuration is a reliable indication of the performance of the sorbent when dispersed in a flue gas stream (Meserole et. al., 1999). A system to determine mercury capacity of a sorbent in a packed bed may be constructed as follows. The system consisted of a laboratory furnace, a system to supply the test gases, a mercury analyzer, and a data acquisition system. The sorbent material was placed in a ½" diameter by 10" long stainless steel tube and connected into system plumbing. Piping held the sorbent tube inside an electric tube furnace. The furnace was used to control the temperature of the sorbent chamber during the sorption and desorption processes. The test gas mixture was a blend of nitrogen, oxygen, carbon dioxide, water vapor, sulfur dioxide, and nitrogen oxides. Several mass flow controllers were used to meter individual gases together. High-pressure gas cylinders supplied all gases except nitrogen, which was provided by a nitrogen membrane system. Oxygen content in the nitrogen stream was roughly 8% by volume. Finally, the test gas was humidified by passing a stream of nitrogen through a water chamber, with the humidity level determined by the temperature of the water.

Mercury permeation tubes from VICI Metronics (Poulsbo, Wash.) provided the mercury source for the sorption tests. The permeation tubes are made of ¼" silicone tubing with liquid elemental mercury inside. Caps are used on the ends of the tubing to contain the mercury. The diffusion rate of mercury through the wall of the tube is a function of the geometry of the tube and the temperature at which the perm tube is stored. A single perm tube was placed in a 1" diameter stainless steel tube and maintained at a temperature of 104° F. inside a laboratory oven. A stream of dry nitrogen gas flowed through the stainless steel tube to transport the mercury-containing gas to the test gas manifold. There, the mercury mixed with the other gases to create the sorption test gas. The mercury concentration in the test gas is determined by the mercury emission rate from the perm tube divided by the total gas flow rate. For this project, the mercury concentration varied between 50 to 70 μg/m$^3$, depending on the test.

Sorbents were prepared as described in Examples 1–3 with the exception that montmorillonite was substituted for vermiculite for some of the test sorbents. In this Example, stabilized ion exchanged agents using either bentonite (montmorillanite) or vermiculite as the substrate were prepared as described in Examples 1–3. For samples #7 and #8 in Table 5, bentonite was obtained from the Lovell mine, Wyoming. Substrates were substituted at the 10% copper level with cuprammonium, then treated with either calcium polysulfide or sodium sulfide as described in Examples 1–3.

All sorbent tests were conducted with either a 0.1-gram or 0.5-gram sample of sorbent dispersed in 20 grams of quartz sand (+50, −70 mesh) and placed in the sorbent tube with glass wool plugs above and below the sorbent bed to hold it in position. The sorbent tube was connected into the sorption test chamber plumbing and heated to 280° F. Hot nitrogen gas flowed through the sorbent test chamber while the equipment was heated to the sorption temperature. Once the test fixture was up to temperature, the other gases (carbon dioxide, sulfur dioxide and nitric oxide/nitrogen dioxide) were added. The composition of the test gas was chosen to simulate a flue gas burning an eastern bituminous coal. Table 4 lists the test conditions for the sorbent tests.

TABLE 4

Summary of Sorbent Test Conditions

| Sorption Test Gas Parameter | Nominal Condition |
|---|---|
| Sorption Temperature | 290° F. |
| Sorption Pressure | 12 psia |
| Gas Flow Rate | 944 sccm |

| Test Gas Constituents | Nominal Concentration |
|---|---|
| Sulfur Dioxide | 1200 ppm |
| Nitric Oxide/Nitrogen Dioxide | 400 ppm |
| Carbon Dioxide | 12% |
| Oxygen | 5% |
| Water | 7% |
| Nitrogen | Balance |
| Elemental Mercury | 50–70 microgram/sm$^3$ |

Once loaded into the test fixture, the sorbents were exposed to the test gas until significant mercury breakthrough (>50%) was detected. At that time, the sorption process was halted. At the end of the sorption cycle, the acid gases and mercury were discontinued so that only nitrogen was flowing through the sorbent chamber while the chamber was cooled to ambient temperatures. The sorbent/sand mixture was removed from the test fixture and digested with an aqua-regia solution. Briefly, the sorbent/sand mixture was placed in a beaker, and 10 mL of 12N HCl was added. The mixture was heated on a hot plate but not to boiling. After ten minutes, 10 mL of 16 N nitric acid was added and allowed to sit overnight, uncovered, on a hot plate (but not to boiling). The mixture is then allowed to cool and diluted to 100 mL with distilled, deionized water. The leachate was then analyzed for total mercury by atomic absorption using a Perkin-Elmer CVAA according to manufacturer's instructions. Table 5 shows results of these tests, expressed as ug Hg per gram agent (stabilized ion exchange sorbent containing agent).

TABLE 5

Mercury sorption capacity of several stabilized ion exchange agents of the present invention.

| test | Prepared as described in Example | substrate | Percent copper | sulfide source | Capacity ug/g |
|---|---|---|---|---|---|
| 1 | 1 | Vermiculite-Palabora | 10 | Cascade | 640 |

TABLE 5-continued

Mercury sorption capacity of several stabilized ion exchange agents of the present invention.

| test | Prepared as described in Example | substrate | Percent copper | sulfide source | Capacity ug/g |
|---|---|---|---|---|---|
| 2 | 2 | Vermiculite-Palabora | 10 | Cascade | 1128 |
| 3 | 3 | Vermiculite-Palabora | 10 | Cascade | 12500 |
| 4 | 2 | Vermiculite-Palabora | 10 | Cascade | 10000 |
| 5 | 1 | Vermiculite-Palabora | 10 | sodium sulfide | 152 |
| 6 | 2 | Vermiculite-Palabora | 10 | sodium sulfide | 176 |
| 7 | 1 | Bentonite-Lovell | 10 | sodium sulfide | 26.4 |
| 8 | 1 | Bentonite-Lovell | 10 | Cascade | 642 |

The results from Table 5 show that all sorbents contain ion exchange sites capable of sorbing mercury. Variability between samples may be due to the fact that sorbents prepared as described in Example 1 may not have been completely stabilized due to the fact that sulfide was not added in sufficient quantity to attain pH 8.

A number of variations and modifications of the invention can be used. It would be possible to provide for some features of the invention without providing others. In one alternative embodiment, ion exchange is performed under acidic conditions but at a pH above the $pH_{ZPC}$. Operating under such conditions can effect ion exchange at both pH dependent and independent sites. As will be appreciated, metal salts can be used under such conditions to effect ion exchange.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process for treating a fluid comprising at least one ionic contaminant, comprising:
   providing a contaminant removal agent, the agent comprising a polyvalent metal sulfide located at pH dependent ion exchange sites on a surface of a substrate; and
   contacting the fluid with the agent to remove at least most of a mercury-containing contaminant from the fluid to form a treated fluid and a mercury-bearing agent.

2. The process of claim 1, wherein the fluid is an aqueous liquid.

3. The process of claim 1, wherein the contaminant removal agent comprises a substrate that is at least one of vermiculite, montmorillonite, and zeolite.

4. The process of claim 1, wherein the agent further comprises a plurality of ion exchange sites that are pH independent in addition to the pH dependent ion exchange sites and wherein the polyvalent metal sulfide is located at both pH dependent and independent ion exchange sites.

5. The process of claim 1, wherein the polyvalent metal is copper.

6. The process of claim 1, wherein the metal sulfide is copper sulfide.

7. The process of claim 1, wherein the polyvalent metal sulfide is a compound of copper and sulfur.

8. The process of claim 1, wherein the agent substrate has a platelike structure and the pH dependent sites are located on edges of the plates.

9. The process of claim 1, wherein the substrate has an ion exchange capacity ranging from about 50 to about 150 mEq/g.

10. The process of claim 1, wherein the fluid is a liquid having a pH ranging from about pH 5 to about pH 9.

11. The process of claim 1, wherein the substrate is a layered silicate.

12. The fluid stream treated by the process of claim 1.

13. The mercury-bearing agent of claim 1.

14. A system for purifying a mercury-containing fluid, comprising:
   a device operable to contact the fluid with a contaminant removal agent, the agent comprising a substrate having an ion exchange capacity of at least about 50 mEq/100 g and a plurality of ion exchange sites, wherein the plurality of ion exchange sites comprise pH dependent sites and pH independent sites, and wherein polyvalent metal sulfides are located at each of the plurality of ion exchange sites;
   an input into the vessel for the fluid; and
   an output from the vessel for a treated fluid.

15. The system of claim 14, wherein the metal sulfides comprise copper sulfide.

16. The system of claim 14, wherein the substrate is a silicate.

17. The system of claim 14, wherein the substrate is a phyllosilicate.

18. The system of claim 14, wherein the substrate is a zeolite.

19. The system of claim 14, wherein the substrate is at least one of vermiculite and montmorillonite.

20. The system of claim 14, wherein the ion exchange capacity ranges from about 50 to about 150 mEq/100 g.

21. The system of claim 14, wherein the polyvalent metal sulfide is a compound of copper and sulfur.

22. The system of claim 14, wherein the polyvalent metal is selected from the group consisting of copper, nickel, chromium, cobalt, silver, cadmium, and mixtures thereof.

23. The system of claim 14, wherein the fluid is a gas comprising mercury.

24. The system of claim 23, wherein the mercury is in speciated and elemental form.

25. The system of claim 14, wherein the fluid is a liquid comprising dissolved mercury.

26. The system of claim 25, wherein the mercury is in speciated and elemental form.

27. A particle for removing a contaminant from a fluid, comprising:
    a substrate having an ion exchange capacity of at least about 50 mEq/10 g and a plurality of ion exchange sites, wherein the plurality of ion exchange sites comprise a first set of sites that are pH independent and a second set of sites that are pH dependent; and
    polyvalent metal sulfides located at each of the plurality of ion exchange sites.

28. The particle of claim 27, wherein the polyvalent metal sulfides comprise copper sulfide.

29. The particle of claim 27, wherein the substrate is a silicate and the first and second sets of sites are discontinuous.

30. The particle of claim 29, wherein the silicate is a phyllosilicate.

31. The particle of claim 29, wherein the silicate is a zeolite.

32. The particle of claim 29, wherein the silicate is at least one of vermiculite and montmorillonite.

33. The particle of claim 29, wherein the ion exchange capacity ranges from about 50 to about 150 mEq/100 g.

34. The particle of claim 27, wherein the polyvalent metal sulfides comprise a compound of copper and sulfur.

35. The particle of claim 27, wherein the pH dependent ion exchange sites are located on exposed surfaces of plates forming the substrate.

36. The particle of claim 27, wherein the fluid is a liquid and the substrate is adhered to a carrier substrate different from the substrate.

37. The particle of claim 27, wherein the polyvalent metal is selected from the group consisting essentially of copper, nickel, chromium, cobalt, silver, cadmium and mixtures thereof.

38. The particle of claim 27, wherein the polyvalent metal is copper.

39. The particle of claim 27, wherein the fluid is a gas and further comprising mercury atoms sorbed onto the particle.

40. An intermediate product in the manufacture of a particle for removing a contaminant from a fluid, comprising:
    a substrate having an ion exchange capacity of at least about 50 mEq/100 g and a plurality of ion exchange sites; and
    polyvalent metal and ammonia complexes at each of the plurality of ion exchange sites.

41. The intermediate product of claim 40, wherein the polyvalent metal and ammonia complexes comprise polyvalent metal ammonium complexes.

42. The intermediate product of claim 40, wherein the polyvalent metal and ammonia complexes comprise polyvalent metal ammine complexes.

43. The intermediate product of claim 40, wherein the polyvalent metal and ammonia complexes comprise cuprammine.

44. The intermediate product of claim 40, wherein the plurality of ion exchange sites comprise a first set of sites that are pH independent and a second set of sites that are pH dependent, and wherein the polyvalent metal and ammonia complexes are located at each of the first and second set of sites.

45. The intermediate product of claim 44, wherein the pH dependent ion exchange sites are located on exposed surfaces of plates forming the substrate.

46. The intermediate product of claim 40, wherein the substrate is a silicate.

47. The intermediate product of claim 40, wherein the substrate is a phyllosilicate.

48. The intermediate product of claim 40, wherein the substrate is a zeolite.

49. The intermediate product of claim 40, wherein the substrate is at least one of vermiculite and montmorillonite.

50. The intermediate product of claim 40, wherein the ion exchange capacity ranges from about 50 to about 150 mEq/100 g.

51. The intermediate product of claim 40, wherein the polyvalent metal is selected from the group consisting essentially of copper, nickel, chromium, cobalt, silver, cadmium and mixtures thereof.

52. The intermediate product of claim 40, wherein the polyvalent metal is copper.

53. A method for manufacturing a contaminant removal agent, comprising:
    (a) providing a substrate having a plurality of ion exchange sites; and
    (b) contacting a solution comprising dissolved polyvalent metal ions with the substrate to form an ion exchanged substrate having polyvalent metal ions exchanged at the plurality of ion exchange sites, wherein the pH of the solution in the contacting step is greater than the $pH_{ZPC}$ for the substrate.

54. The method of claim 53, further comprising:
    (c) contacting the ion exchanged substrate with a sulfide-containing fluid to convert at least most of the polyvalent metal ions exchanged at the plurality of ion exchange sites into metal sulfides.

55. The method of claim 54, wherein the metal sulfide is copper sulfide.

56. The method of claim 54, wherein the metal sulfide is a compound of copper and sulfur.

57. The method of claim 54, wherein the metal sulfides are discontinuously distributed over the substrate.

58. The method of claim 54, wherein, in step (c), the sulfide-containing fluid is a liquid having a pH ranging from about pH 8 to about pH 12.

59. The method of claim 54, wherein the sulfide ion concentration in the sulfide-containing fluid ranges from about 2 to about 20 wt. %.

60. The method of claim 53, wherein the polyvalent metal ions in step (b) are in the form of a tetraammine complex in the solution.

61. The method of claim 53, wherein the substrate is at least one of vermiculite, montmorillonite, and zeolite.

62. The method of claim 53, wherein the polyvalent metal is selected from the group consisting essentially of copper, nickel, chromium, cobalt, silver, cadmium and mixtures thereof.

63. The method of claim 53, wherein the polyvalent metal is copper.

64. The method of claim 53, wherein the substrate has an ion exchange capacity ranging from about 50 to about 150 mEq/100 g.

65. The method of claim 53, wherein a concentration of the dissolved polyvalent metal in the solution is at least about 2 wt. %.

66. The method of claim 53, wherein the plurality of ion exchange sites comprise pH dependent and pH independent ion exchange sites and wherein the polyvalent metal is located at each of the plurality of sites.

67. The method of claim 53, wherein in the contacting step the dissolved polyvalent metal ions are compounded with ammonia.

68. The method of claim 67, wherein the concentration of the polyvalent metal ions in the solution is at least about 1 wt. %.

69. The method of claim 67, wherein the pH of the solution is at least about pH 9.

* * * * *